United States Patent [19]
Ogawa et al.

[11] Patent Number: 6,142,634
[45] Date of Patent: *Nov. 7, 2000

[54] PROJECTOR

[75] Inventors: Yasunori Ogawa; Shinji Haba; Akitaka Yajima; Toshiaki Hashizume; Hisashi Iechika, all of Suwa, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/912,566

[22] Filed: Aug. 18, 1997

[30] Foreign Application Priority Data

Aug. 19, 1996 [JP] Japan ................................. 8-217652
Jul. 2, 1997 [JP] Japan ................................. 9-177453

[51] Int. Cl.⁷ .................................................. G03B 21/14
[52] U.S. Cl. ........................................... 353/38; 353/101
[58] Field of Search ................................. 353/38, 20, 31, 353/34, 37, 10.1, 119, 98, 99, 69, 70; 349/8, 9

[56] References Cited

U.S. PATENT DOCUMENTS

| | | |
|---|---|---|
| 4,645,319 | 2/1987 | Fekete . |
| 5,092,671 | 3/1992 | Van Os .................................... 353/119 |
| 5,098,184 | 3/1992 | Van Den Brandt ......................... 353/31 |
| 5,278,680 | 1/1994 | Karasawa et al. . |
| 5,283,599 | 2/1994 | Tejima et al. ............................ 353/101 |
| 5,283,600 | 2/1994 | Imai .......................................... 353/20 |
| 5,283,602 | 2/1994 | Kwon ........................................ 353/69 |
| 5,626,409 | 5/1997 | Nakayama et al. ........................ 353/34 |
| 5,865,521 | 3/2000 | Hasizume et al. ........................ 353/38 |
| 6,028,703 | 2/2000 | Sekine et al. ............................. 353/20 |
| 6,036,318 | 3/2000 | Itoh ........................................... 353/20 |

FOREIGN PATENT DOCUMENTS

| | | |
|---|---|---|
| 0 676 902 A2 | 10/1995 | European Pat. Off. . |
| 0 803 754 A1 | 10/1997 | European Pat. Off. . |
| 61-118707 | 6/1986 | Japan . |
| 63-185188 | 7/1988 | Japan . |
| 3-111806 | 5/1991 | Japan . |
| 8-184797 | 7/1996 | Japan . |

*Primary Examiner*—William Dowling
*Attorney, Agent, or Firm*—Oliff & Berridge, PLC

[57] ABSTRACT

A projection-type display apparatus in accordance with the invention reduces the margin formed around the image forming range of the light valves, and forms a bright projected image. Emitted light from a light source lamp unit of a projection-type display apparatus illuminates liquid crystal light valves of each color via an integrator optical system. First and second lens plates of an integrator optical system that serves as a uniform illuminating optical system are disposed such that the attachment position thereof is capable of fine adjustment in a direction vertical to the optical axis. By performing fine adjustment of the attachment position of these, the forming position of the illumination range B can be adjusted to include the image forming range A of the liquid crystal light valves. Accordingly, there is no need to provide a wide margin around the image forming range A, taking shifting of the forming position of the illumination range B into consideration. Thus, efficient usage of the illumination light can be increased, thereby improving the brightness of the projected image.

21 Claims, 13 Drawing Sheets

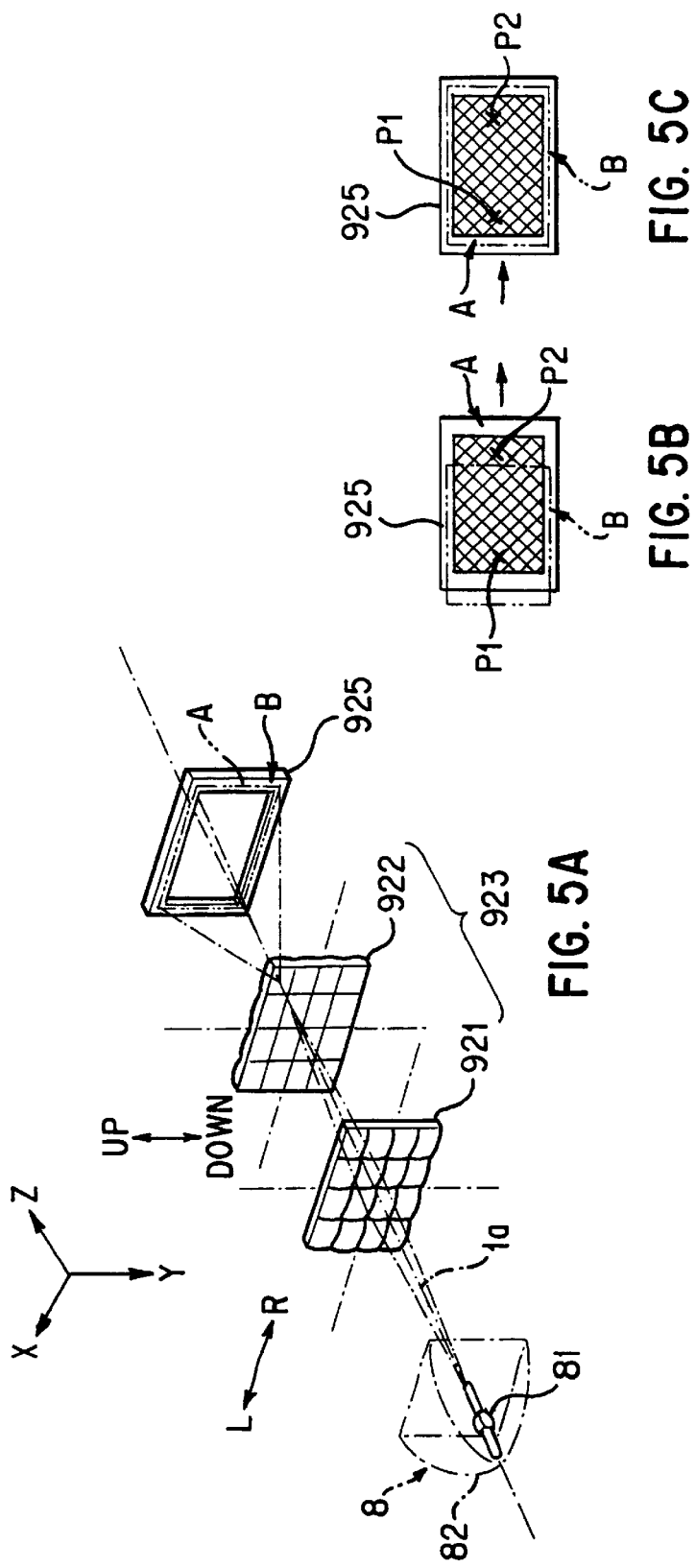

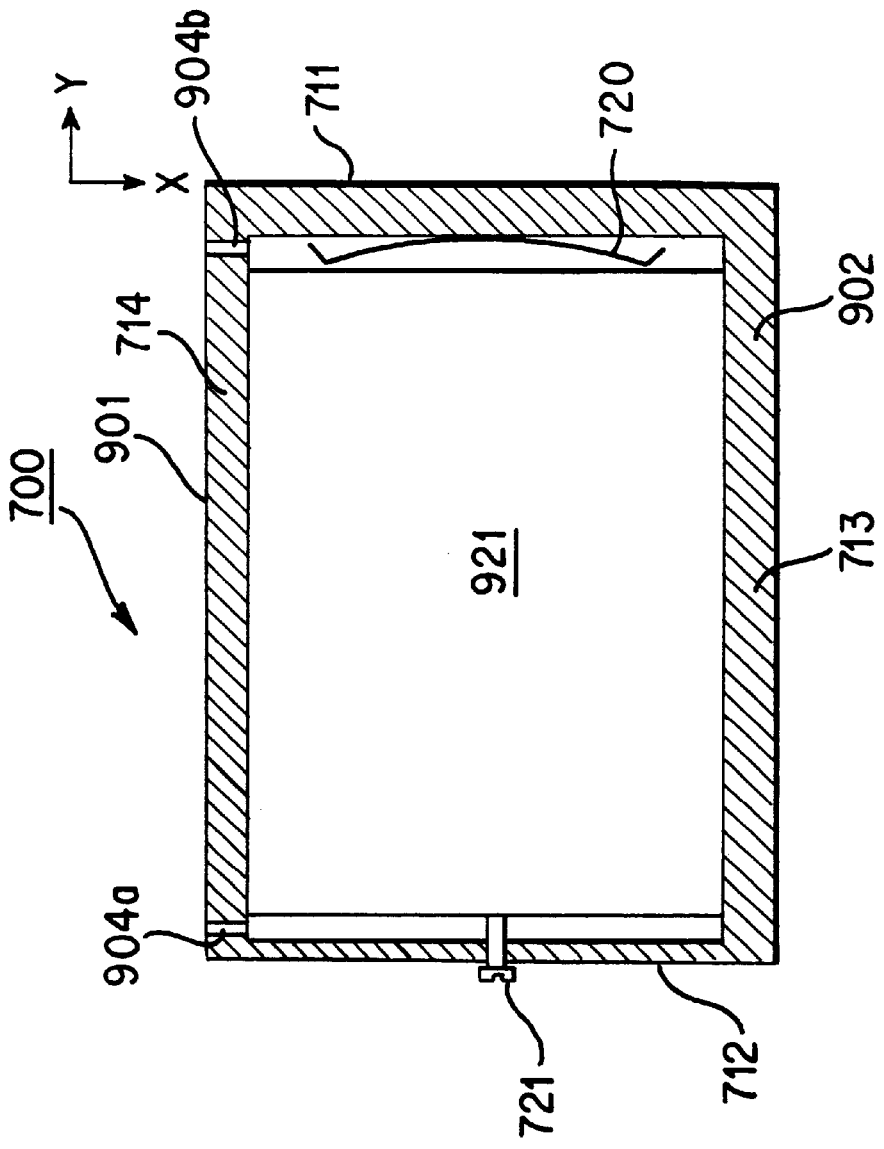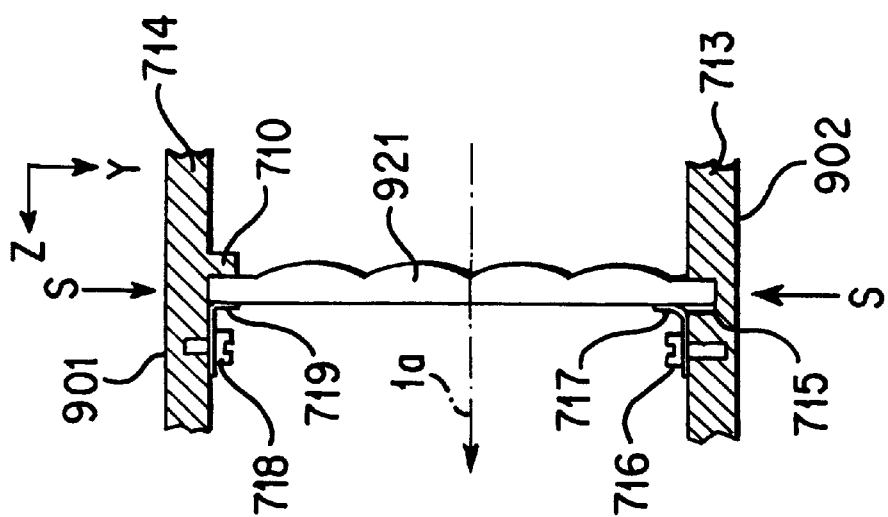

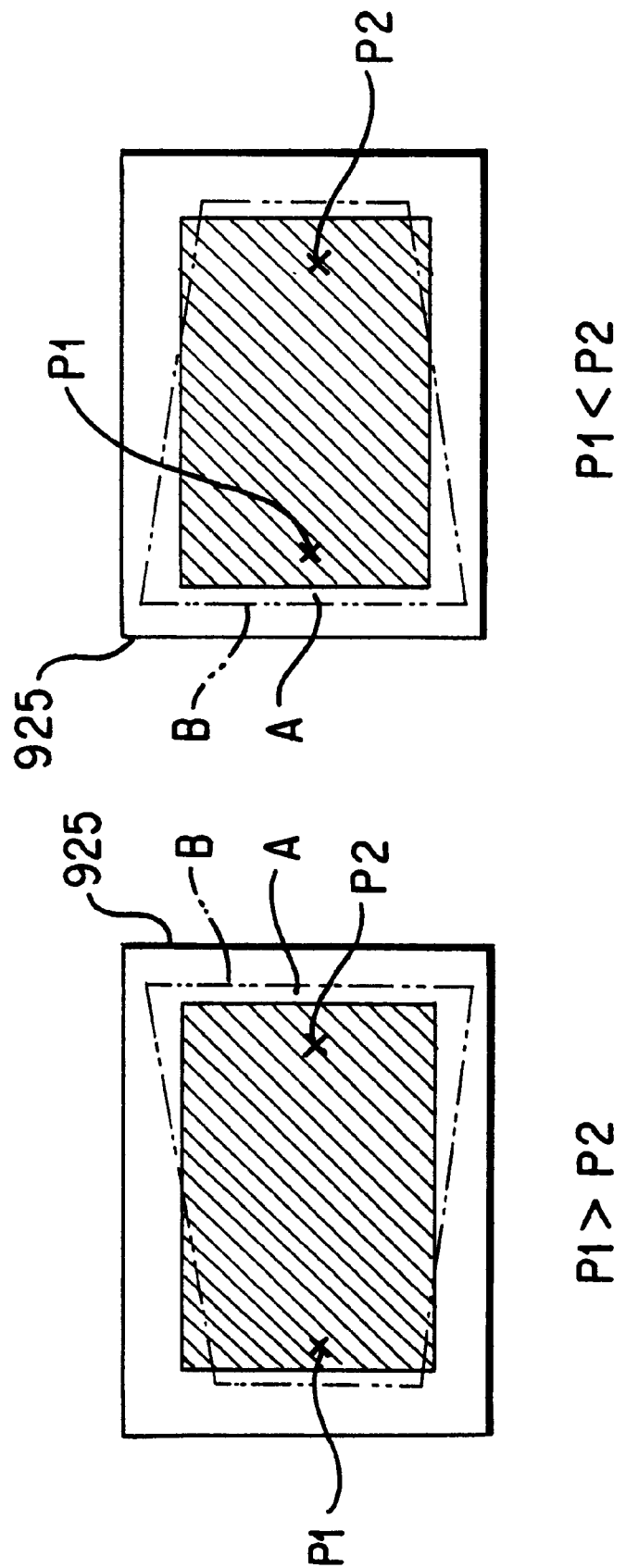

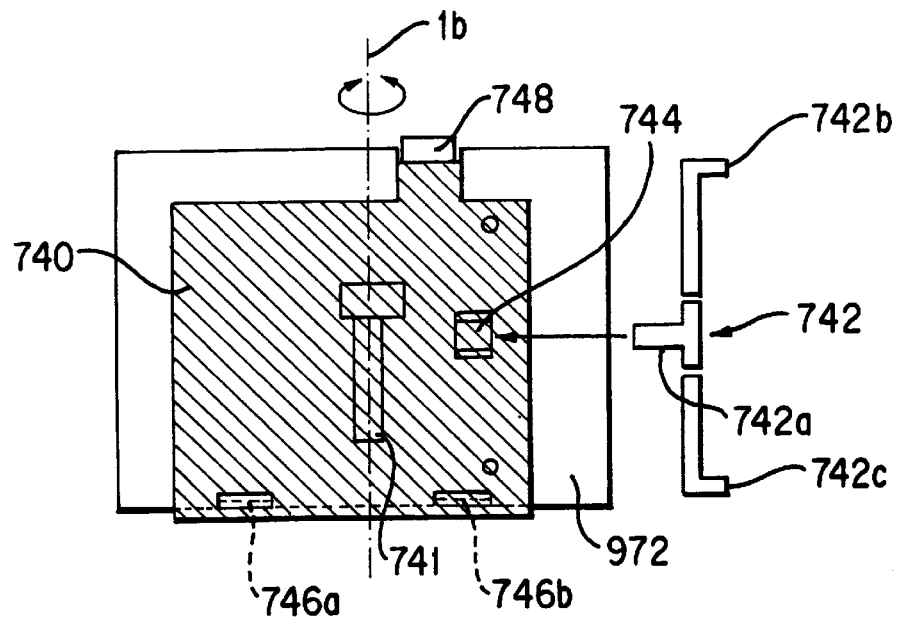
FIG. 8A
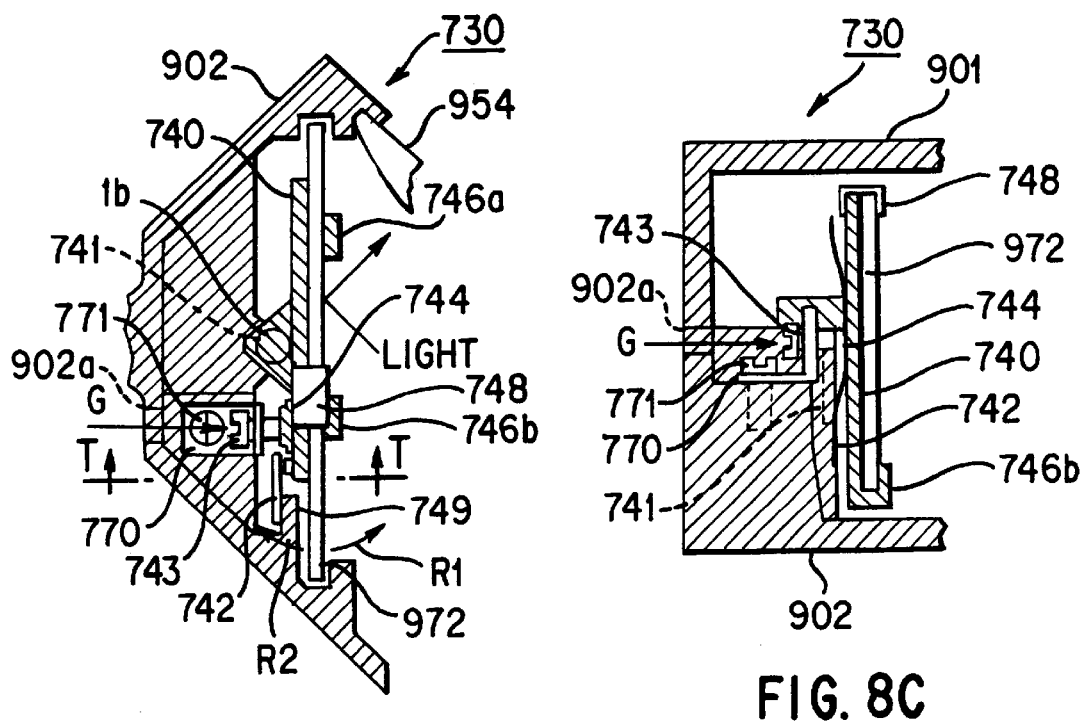
FIG. 8B
FIG. 8C

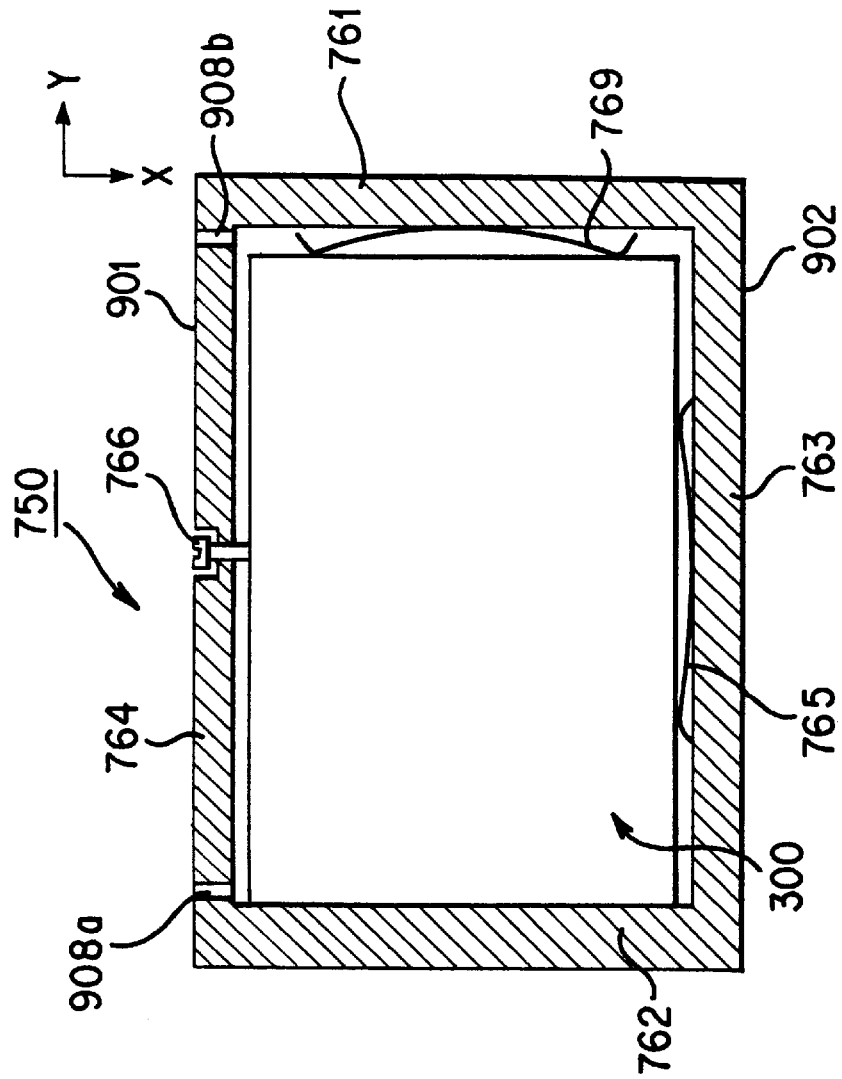
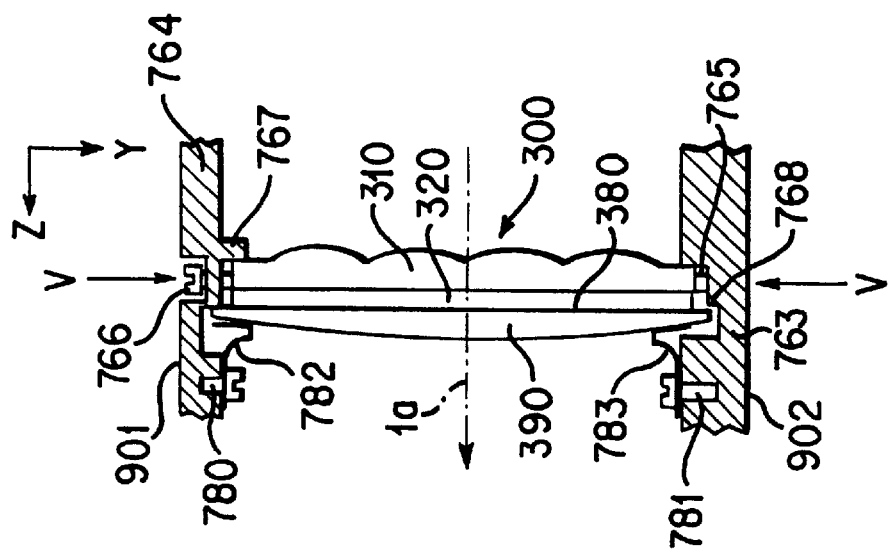
FIG. 11B
FIG. 11A

PROJECTOR

BACKGROUND OF THE INVENTION

1. Field of Invention

The invention relates to a projection-type display apparatus which modulates light emitted from a light source in accordance with image signals using modulation devices such as liquid crystal light valves or the like, and performs enlarged projection of the light flux following modulation upon a screen via a projecting lens. More particularly, the invention relates to a structure for a projection-type display apparatus of such a type whereby the image formation range of the modulating devices can be illuminated in an appropriate manner.

2. Description of Related Art

A conventional projection-type display apparatus which forms modulated light flux in accordance with image signals using liquid crystal light valves and performs enlarged projection of the modulated light flux on a screen is disclosed in Japanese Unexamined Patent Publication No. 3-111806. The projection-type display apparatus disclosed in this Patent Publication is, as shown in FIG. 14, provided with an integrator optical system 923. The integrator optical system 923 has two lens plates 921 and 922 for uniform illumination of the image formation range of the liquid crystal light valve 925. The liquid crystal light valve 925 serves as the modulation device of the light emitted from the light source.

In FIG. 14, the single light flux emitted from the light source lamp unit 8 is separated into a plurality of intermediate light fluxes by lenses 921a of the first lens plate 921. The light flux is superimposed on the liquid crystal light valve 925 via lenses 922a of the second lens plate 922.

Regarding projection-type display apparatuses of the type illustrated in FIG. 14, problems occur when the image formation range of the liquid crystal light valve 925 cannot be illuminated accurately. These problems include a reduction in the brightness of the image projected on the projection surface, or the creation of shadows at the edge of the projected image. Accordingly, as illustrated in FIG. 15, a certain margin M is secured around the image formation area A of the liquid crystal light valve 925, depending on various factors including the positioning precision of the liquid crystal light valve 925 and the lens plates 921 and 922 of the integrator optical system 923, the margin of error of the focal distance and so forth of the lenses 921a and 922a of each of the lens plates, and the positioning precision and the like of other optical components disposed on the optical path. In other words, the image formation area A of the liquid crystal light valve 925 is sized to be distinctly smaller than the illumination range B of light emitted by the light source, so that even in the event that the illumination range B is shifted vertically or horizontally due to the positioning precision of the above-described components, the image formation range A does not extend beyond the illumination range B. This structure avoids problems such as the reduction of the brightness of the image projected on the projection surface, or the creation of shadows at the edge of the projected image. Thus, simply increasing the margin M is sufficient to deal with a wide margin of error in positioning of the above-described components.

On the other hand, in order to increase the brightness of the projected image, it is necessary to increase the usage efficiency of the light which is illuminating the liquid crystal light valve 925. However, the problem occurs that when the margin M is increased to deal with a wide margin of error in positioning of the above-described components, the usage efficiency of the separated light decreases, and the projected image becomes dark. Accordingly, from this perspective, it is desirable that the margin formed around the display range of the liquid crystal light valve be as narrow as possible. However, if the margin is made to be narrow, the illumination range misses the image formation range of the liquid crystal light valve, as described above, so that shadows may be formed at the edge of the projected image.

SUMMARY OF THE INVENTION

It is therefore an object of the invention to provide a projection-type display apparatus wherein the margin formed around the image forming range of the liquid crystal light valve is small, and at the same time, capable of increasing the brightness of the projected image without forming shadows at the edge of the projected image.

In order to solve the above-described problems, a first projection-type display apparatus in accordance with the invention includes a light source; a modulating device for modulating light flux emitted from the light source in accordance with image signals; and a projecting device for performing enlarged projection of the light flux modulated by the modulating device upon a projection surface; wherein an integrator optical system having a first lens plate and a second lens plate that include a plurality of lenses arrayed in matrix-form is placed in the optical path between the light source and the modulating device; and wherein at least one of the first and second lens plates is arranged so that an attachment position thereof is adjustable in a direction intersecting the optical axis.

According to the structure described above, the invention is capable of increasing the usage efficiency of the light which is illuminating the modulating device, and the projected image can be made to be brighter. Also, fine adjustment of the illumination area of the modulation device can be performed so that the image forming range is positioned within the illumination area, which avoids problems such as the reduction of the brightness of the image projected upon the projection surface, or the creation of shadows at the edge of the projected image, even if the margin formed around the image forming range of the modulation device is made to be small.

In other words, subsequent to mounting the various components of the optical system, the image forming range of the modulation device is illuminated using the integrator optical system, and in the event that the illumination range is not within the image forming range of the modulation device, the attachment position of the first lens plate or the second lens plate of the integrator optical system is subjected to fine adjustment, so that the image forming range of the modulation device can be brought to be completely within the illumination range. Accordingly, the margin formed around the image forming range of the modulation device can be reduced and still handle the offset between the illumination range and the image formation range caused by the margin of error in the positioning of optical parts.

Further, the reflecting device for bending the optical path is sometimes provided on the optical path extending from the light source to the modulation device of projection-type apparatuses. In such cases, any margin of error in the attachment angle of the reflecting device may cause the illumination range to be offset from the image formation range of the modulating device. Accordingly, it is desirable that the attachment angle of the reflecting device mounted to this position also be adjustable relative to the incident optical axis.

Also, the above-described first embodiment of the projection-type display apparatus can similarly be applied to projection-type display apparatuses capable of projecting color images. In other words, the invention can similarly be applied to a projection-type display apparatus that includes a color separating optical system for separating the light emitted from the light source into light flux of each color, a plurality of the modulating devices for modulating the light flux of each color separated by the color separating optical system, and a color synthesizing system for synthesizing the light flux of each color modulated by the plurality of the modulating devices, wherein the modulated light flux synthesized by the color synthesizing system is projected on a projecting surface via the projecting device.

With such projection-type display apparatuses capable of projecting color images, reflecting devices for bending the optical path are sometimes also provided on the optical path from the color separating optical system to at least one of the modulation devices. In such cases, the attachment angle of any of the reflecting devices may cause the illumination range to be offset. Accordingly, it is desirable that the attachment angle of the reflecting device mounted to this position be also adjustable relative to the incident optical axis.

It is most advantageous, from the perspective of apparatus construction and from the perspective of precision of position adjustment of the illumination range as to the modulation device to make the attachment angle of the reflecting means mounted to the position closest to the modulating device to be adjustable.

Also, using reflecting type modulation devices for the modulation, and manufacturing the color separating optical system and the color synthesizing optical system as a single optical system, shortens the optical path, which reduces the size of the projection-type display apparatus.

A second projection-type display apparatus in accordance with the invention is described below. The second projection-type display apparatus in accordance with the invention includes a light source; a first optical component for splitting the light fluxes emitted from the light source into a plurality of intermediate light fluxes; a second optical component disposed in the proximity of the position at which the intermediate light fluxes are focused; a modulating device for modulating light emitted from the second optical component; and a projecting device for performing enlarged projection of the light flux modulated by the modulating device on a projection surface; wherein the second optical component includes a focusing lens array for focusing each of the plurality of intermediate light fluxes divided by the first optical component; a polarization converting device which spatially splits each of the plurality of intermediate light fluxes focused by the focusing lens array into P-polarization light flux and S-polarization light flux, and emits the P-polarization light flux and S-polarization light flux with the polarization direction of one matching the polarization direction of the other; and a combining lens for superimposing the light fluxes emitted from the polarization converting device; wherein at least one of the first optical element and the second optical element is arranged so that the attachment position thereof is adjustable in a direction intersecting the optical axis.

The first optical component is equivalent to the aforementioned first lens plate, and the combining lens of the second optical component is equivalent to the aforementioned second lens plate.

The second projection-type display apparatus in accordance with the invention includes a focusing lens array and polarization conversion device in addition to the structure of the first projection-type display apparatus. Accordingly, the same effects as those of the first projection-type display apparatus are obtained, and in addition, a bright projected image can be obtained, since both polarized light fluxes can be used without waste, by using the polarization conversion device. Also, the focusing lens array can be used to efficiently introduce intermediate light fluxes to the focusing lens array, and from this perspective also, a bright projected image can be obtained.

Integrating the focusing lens array, the polarization converting device, and the combining lens, reduces the loss of light between these optical components, which further improves the usage efficiency of light.

Also, as with the aforementioned first projection-type display apparatus, the second projection-type display apparatus in accordance with the invention also allows the reflecting device to be disposed on the optical path that extends from the light source to the modulation device for bending the optical path, having a structure capable of projecting color images, the reflecting device to be disposed on the optical path between the color separating optical system and the modulation device in projection-type display apparatuses capable of projecting color images and adjusting the angle thereof, which enables the attachment angle of the reflecting device positioned closest to the modulating device to be adjustable, and using a reflecting type modulation device as the modulation device. The same effects can be obtained as when using these structures with the first projection-type display apparatus.

Also, the invention can be applied to projection-type display apparatuses which are not provided with integrator optical systems. In such cases, the attachment angle of the reflecting device disposed in the optical path that causes positional change of the illumination range should be adjustable. Also, in this case, the same effects can be obtained as with the aforementioned first projection-type display apparatus. Further, the invention can be applied to projection-type display apparatuses capable of projecting color images which are not provided with integrator optical systems, wherein such cases, the attachment angle of the reflecting device disposed in the optical path between the color synthesizing system and the modulating device should be adjustable so that the same effects can also be obtained as with the aforementioned first projection-type display apparatus.

Now, with the first projection-type display apparatuses in accordance with the invention, in order to make the attachment position of at least one of the first and second lens plates to be adjustable in the direction intersecting the optical axis, an adjustment mechanism should be provided at that end. Examples of arrangements for such an adjustment mechanism include a first adjustment mechanism for adjusting the aforementioned first lens plate in a first direction orthogonally intersecting the optical axis, and a second adjustment mechanism for adjusting the aforementioned second lens plate in a second direction orthogonally intersecting the aforementioned optical axis and the aforementioned first direction.

An adjusting mechanism for adjusting the attachment position of the lens plate in a predetermined direction can include a spring disposed at a first side of the lens plate for pressing the first side; and a screw at a second side of the lens plate opposing the first side thereof, for pressing the second side. By employing such an adjusting mechanism, the lens plate can be moved in the predetermined direction simply by tightening and loosening the screw, which facilitates simple adjustment of the attachment position of the aforementioned lens plate.

Regarding the adjusting mechanism using the spring and screw, uniform movement of the lens plate can be facilitated with a small number of parts, by using a leaf spring for the spring and arranging the screw to press the approximately center portion of the second side of the lens plate.

Also, regarding the second projection-type display apparatus in accordance with the invention, in order to make the attachment position of at least one of the first optical component and second optical component to be adjustable in the direction intersecting the optical axis, an adjustment mechanism should be provided at that end. In the case of the second projection-type display apparatus in accordance with the invention, it is preferable that the focusing lens array, the polarization converting device, and the combining lens be integrated, and this integrated apparatus moved by a single adjusting device. This is because such an arrangement enables simultaneous adjustment of the attachment position of the three optical components.

As for the adjustment mechanism provided to the second projection-type display apparatus in accordance with the invention, an adjustment mechanism can be used that is the same as that of the aforementioned first projection-type display apparatus. For example, an arrangement can be used that includes a first adjustment mechanism for adjusting the aforementioned first optical component in a first direction orthogonally intersecting the optical axis, and a second adjustment mechanism for adjusting the aforementioned second optical component to a second direction orthogonally intersecting the optical axis and the aforementioned first direction. Also, the adjusting mechanism for adjusting the attachment position of the optical component in the predetermined direction can include a spring disposed at a first side of the optical component for pressing the first side; and a screw disposed at a second side of the optical component opposing the first side thereof, for pressing the second side. Further, the adjusting mechanism employing a spring and screw can include a leaf spring used for the spring and the screw can be arranged so as to press the approximately center portion of the second side of the lens plate.

Further, regarding projection-type display apparatuses which are not provided with integrator optical systems, in order to make the attachment angle of the reflecting device positioned in the optical path that causes positional change of the illumination range to be adjustable, an adjustment mechanism should be provided at that end. Regarding such adjustment mechanisms, in the event that the projection-type display apparatus is provided with at least the aforementioned light guide for storing the aforementioned color separation system and the aforementioned reflecting device, an arrangement can be used that includes a holder plate which holds the reflecting device and is rotatably supported by the light guide, a screw for adjusting the angle of the reflecting device, and a spring for supporting the holder plate as to the light guide. Such an adjusting mechanism arrangement enables simple changing of the attachment angle of the reflecting device, simply by adjusting the amount of screwing by the screw.

Also, regarding projection-type display apparatuses capable of projecting color images which are not provided with integrator optical systems, in order to make the attachment angle of the reflecting device positioned in the optical path between the color synthesizing system and the modulating device to be adjustable, an adjustment mechanism should be provided at that end. As described above, with such a projection-type display apparatus, making the attachment angle of the reflecting device mounted at the position closest to the modulating device to be adjustable is most advantageous, from the perspective of apparatus construction and from the perspective of precision of position adjustment of the illumination range as to the modulation device. Regarding such adjustment mechanisms, in the event that the projection-type display apparatus is provided with at least the aforementioned light guide for storing the aforementioned color separation system and the aforementioned reflecting device, an arrangement can be used that includes a holder plate which holds the reflecting device and is rotatably supported by the light guide, a screw for adjusting the angle of the reflecting device, and a spring for supporting the holder plate as to the light guide.

BRIEF DESCRIPTION OF THE DRAWINGS

FIGS. 5(A)–(D) are model illustrations showing the relationship between the illumination range from the integrator optical system, with the display range of the liquid crystal light valve.

FIGS. 6(A) and 6(B) are each schematic cross-sectional views showing a mechanism for making fine adjustment of the attachment position of the lens plate to the left and right.

FIGS. 7(A) and 7(B) are explanatory diagrams showing the change in form of the illumination range of the integrator optical system from the reflecting surface of the reflecting device.

FIGS. 8(A)–(C) show a mechanism for performing fine adjustment of the attachment angle of the reflecting mirror, wherein FIG. 8(A) is an explanatory diagram of the holder plate, FIG. 8(B) is a plan view of the mechanism for performing fine adjustment, and FIG. 8(C) is a cross-section diagram of the fine adjustment mechanism.

FIGS. 11(A) and 11(B) are schematic cross-sectional views showing an example of a mechanism for making fine adjustment of the attachment position of the second optical component in the left and right directions.

DETAILED DESCRIPTION OF PREFERRED EMBODIMENTS

The following is a description of a projection-type display apparatus to which the invention has been applied, with reference to the drawings. In the following description, the three orthogonally intersecting directions are represented by X, Y, and Z, with Z being the direction of progress of light.

Figure 1:
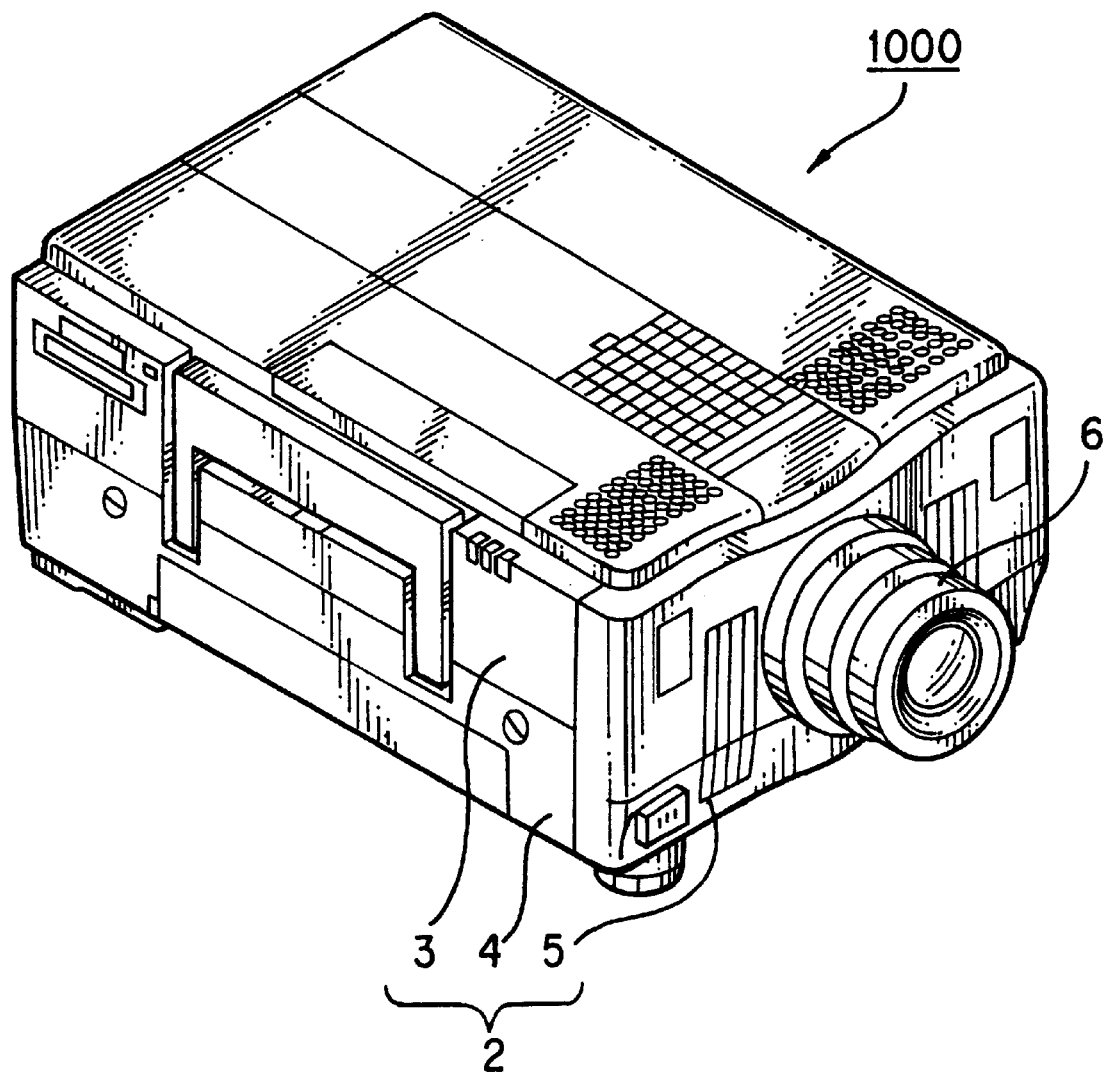
FIG. 1 is a perspective view of the exterior of the projection-type display apparatus in accordance with the invention.

FIG. 1 is a perspective view of a projection-type display apparatus in accordance with the present embodiment of the invention. The projection-type display apparatus 1000 in accordance with the invention is formed such that light fluxes of the colors red, blue, and green are extracted from the light emitted from a light source via an integrator optical system and color separating system. Each of the colors are led to liquid crystal light valves positioned corresponding with each color and modulated according to color image signals. Following re-synthesizing of the color fluxes of each color after modulation, the color fluxes are subjected to enlarged projection thereof on a screen via a projecting lens.

As shown in FIG. 1, the projection-type display apparatus 1000 has a rectangular outer casing 2, and the outer casing 2 basically includes an upper case 3, a lower case 4, and a front case 5 defining the front face of the apparatus. The leading end potion of the projecting lens unit 6 protrudes from the center of the front case 5.

Figure 2A:
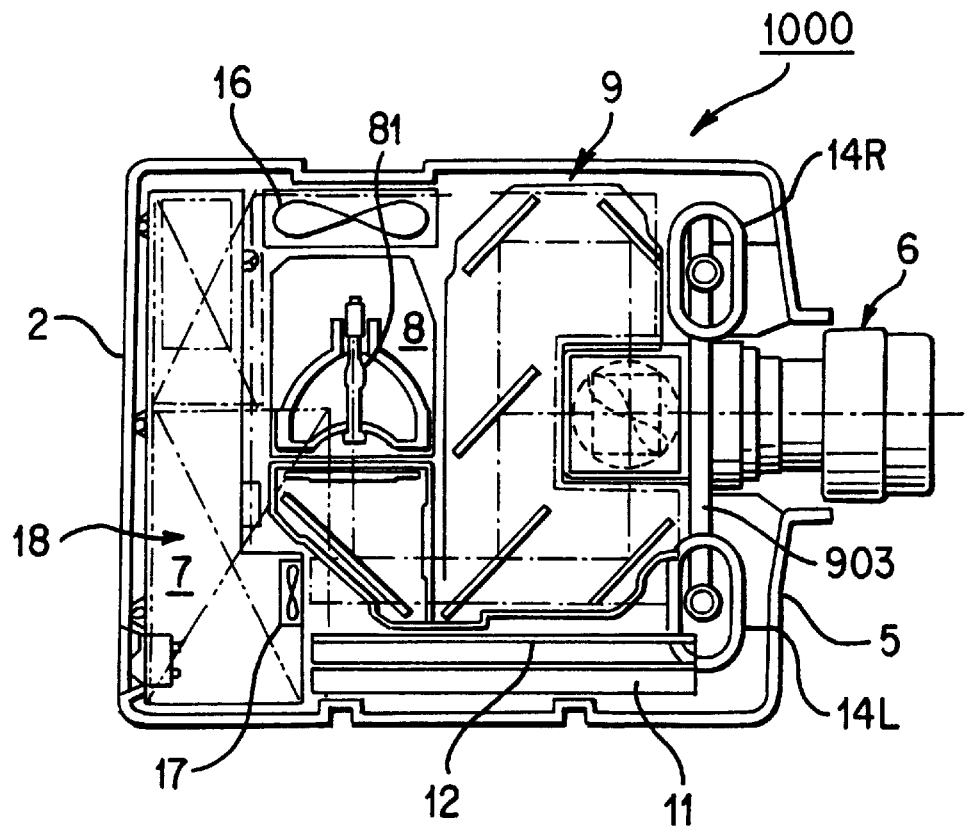
FIG. 2(A) is a broken away top elevational view showing the interior of the projection-type display apparatus.
Figure 2B:
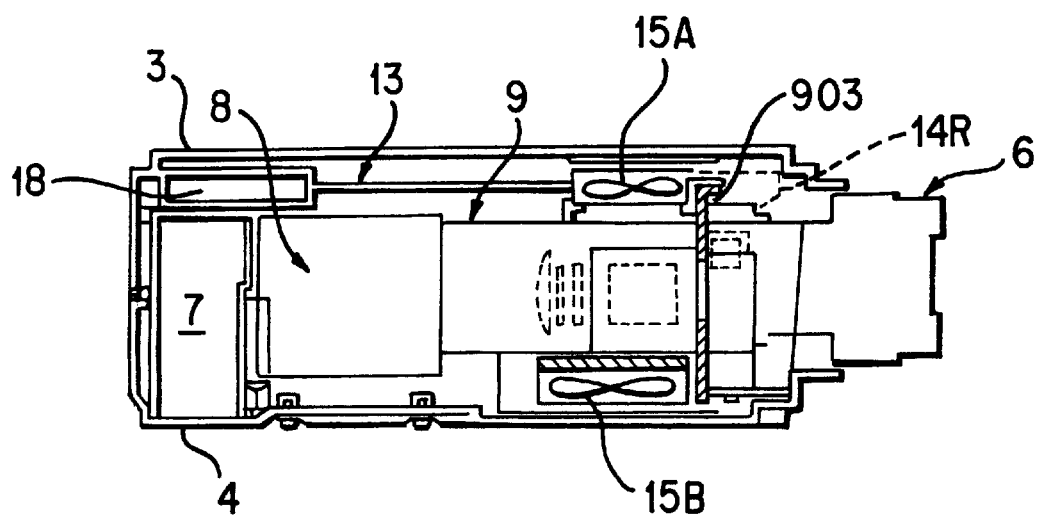
FIG. 2(B) is a broken away side elevational view thereof.

FIG. 2 shows the positional relationship of the components within the outer casing 2 of the projection-type display apparatus 1000. As shown in the Figure, an electric power source unit 7 is disposed at the rear of the outer casing 2. A light source lamp unit 8 is disposed adjacent the electric power source unit 7 toward the front of the apparatus. Also, an optical unit 9 is disposed adjacent the base end of the projecting lens unit 6, which is disposed at the center front of the optical unit 9.

An interface board 11 is disposed at one side of the optical unit 9. The interface board 11 is mounted with an input/output interface circuit facing toward the front and rear sides of the apparatus. A video board 12 mounted with a video signal processing circuit is parallel to the interface board 11. A control board 13 is disposed above the light source lamp unit 8 and optical unit 9 for driving and controlling the apparatus. Speakers 14R and 14L are disposed at the front right and left corners of the apparatus thereof.

A suction fan 15A for cooling is disposed at the center of the upper side of the optical unit 9, and a circulating fan 15B for forming cooling circulation is disposed at the center of the bottom side of the optical unit 9. Also, an exhaust fan 16 is positioned at the side of the apparatus adjacent to the rear side of the light source lamp unit 8. An auxiliary cooling fan 17 for introducing cooling air flow from the suction fan 15A into he electric power source unit 7 is positioned adjacent the edge of the boards 11 and 12 at the electrical power source unit 7.

Further, a floppy disk drive unit (FDD) 18 is disposed immediately above the electric power source unit 7 at the left side of the apparatus.

Figure 3:
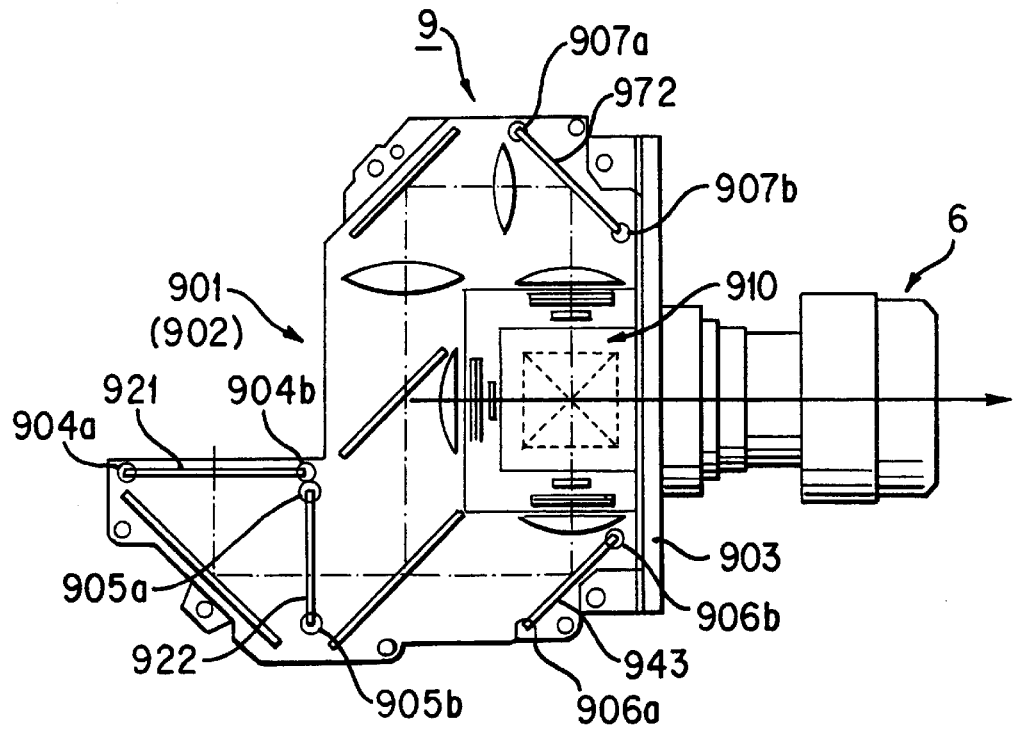
FIG. 3 is a broken away elevational view showing an extracted view of the optical unit and projecting lens unit.

FIG. 3 is a broken away view of the optical unit 9 and projecting lens unit 6. As shown in the Figure, the optical unit 9 is of such a structure that the optical devices other than the prism unit 910 that includes the color synthesizing device are supported by the upper and lower light guides 901 and 902. The upper light guide 901 and lower light guide 902 are each fixed by fixing screws to the upper case 3 and lower case 4, respectively. Also, the upper light guide 901 and lower light guide 902 are also fixed to the side of the prism unit 910 by fixing screws in the same manner. The prism unit 910 is fixed by a fixing screw to the rear side of a thick head plate 903 which is a die-cast plate. The base side of the projecting lens unit 6 is fixed to the front face of the head plate 903 by fixing screws in the same way.

Figure 4:
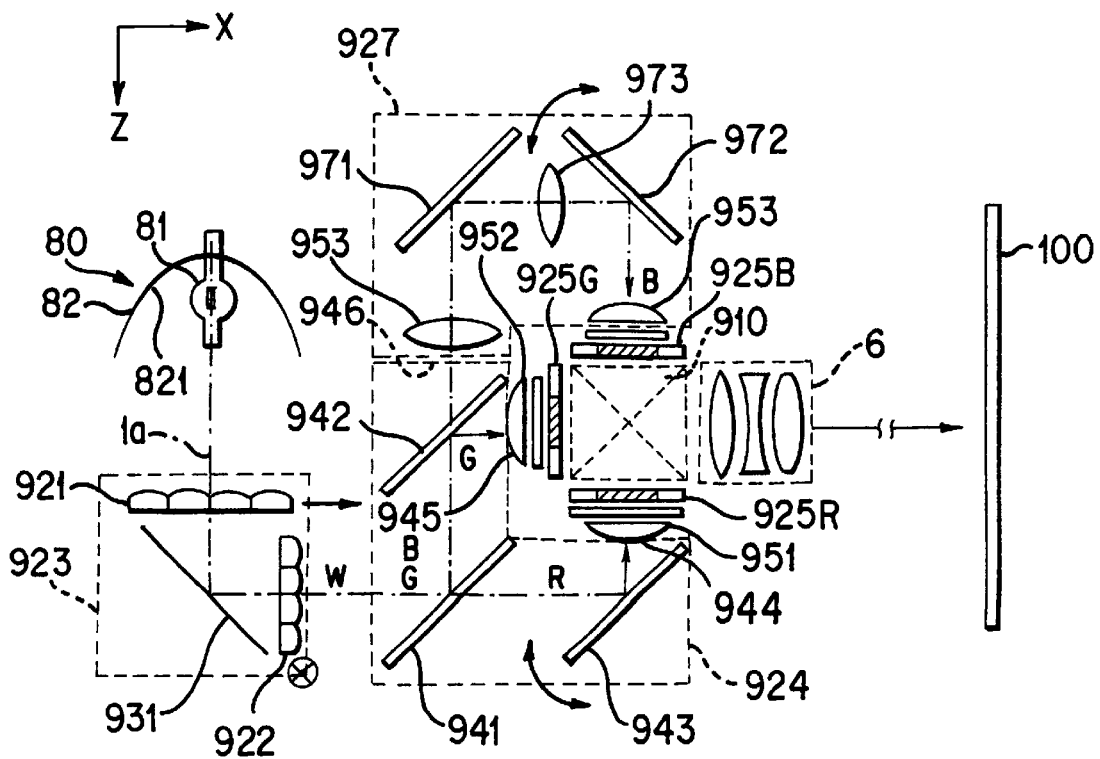
FIG. 4 is a schematic drawing showing the optical system which is incorporated in the optical unit.

FIG. 4 shows a schematic of the optical system which is assembled to the optical unit 9. The optical system which is assembled to the optical unit 9 is described with reference to this Figure. The optical system according to the present embodiment includes a discharge lamp 81 which is a component of the aforementioned light source lamp unit 8, and an integrator optical system 923 which includes a first lens plate 921 and a second lens plate 922 which are uniform illumination optical devices. This system also includes a color separating optical system 924 which separates the white light flux W emitted from the integrator optical system 923 into the red, green, and blue color light fluxes, i.e., R, G, and B, three liquid crystal light valves 925R, 925G, and 925B which serve as light valves for modulating the color light fluxes, a prism unit 910 serving as a color synthesizing system for re-synthesizing the modulated color fluxes, and a projecting lens unit 6 for performing enlarged projection of the synthesized light flux on the surface of a screen 100. Further, the system includes a light guiding system 927 for guiding the blue-colored light flux B of the color light fluxes separated by the color separating optical system 924 to the liquid crystal light valve 925B.

Lamps such as halogen lamps, metal-halide lamps, xenon lamps, and the like can be used as the discharge lamp 81. The uniform illumination optical system 923 is provided with a reflecting mirror 931, so as to bend the center optical axis 1a of the emitted light from the integrator optical system 923 toward the front of the apparatus. The first and second lens plates 921 and 922 are disposed on either side of this mirror 931 in an orthogonal relationship.

The light emitted from the discharge lamp 81 is reflected by the reflecting face 821 of the reflector 82 and is irradiated upon the first lens plate 921 as parallel light beams, each beam being projected as a secondary light source image upon the incidence plate of each lens of the second lens plate 922 via the first lens plate 921, and the light emitted from this second lens plate 922 illuminates the object to be illuminated. In other words, the image forming range of each light valve 925R, 925G, and 925B is illuminated.

The color separating optical system 924 includes a blue-green reflecting dichroic mirror 941, a green reflecting dichroic mirror 942, and a reflecting mirror 943. In the blue-green reflecting dichroic mirror 941, the blue light flux B and the green light flux G in the white light flux W is reflected at a right angle, and go to the green reflecting dichroic mirror 942.

The red light flux R passes through the mirror 941, is reflected at a right angle by the posterior reflecting mirror 943, and is emitted from the red light flux emitting portion 944 to the prism unit 910. The blue and green light fluxes 9 and G are reflected by the mirror 941. The green light flux G thereof is alone reflected at the green reflecting dichroic mirror 942, and is emitted from the green light flux emitting portion 945 to the prism unit 910. The blue light flux B passes through the mirror 942 and go to the light guiding system 927 via the blue light flux emitting portion 946. In the present embodiment, the arrangement is such that the distances between the white light flux emitting portion of the integrator optical system 923 to each of the light flux emitting portions 944, 945, and 946 of the color separating optical system 924 are the same.

Focusing lenses 951 and 952 are respectively provided to each of the red light flux and green light flux emitting portions 944 and 945 of the color separating optical system 924. Accordingly, the light flux of each color emitted from each of the emitting portions becomes incident light to the focusing lenses 951 and 952, and are made to be parallel.

The parallel red and green light fluxes R and G are cast into the crystal light valves 925R and 925G, and modulated adding image information corresponding to each color light. In other words, the light valves are subjected to switching control according to image information by a driving device (not shown), and accordingly, each of the light fluxes passing through is modulated. Conventional mechanisms can be used as the driving device. On the other hand, the blue light flux B is led to the corresponding crystal light valve 925B via the light guiding system 927, and similar modulation is performed in accordance with image information. The light valves may be of the type using poly-silicone TFT as the switching devices, for example.

The light guiding system 927 includes a focusing lens 953, an incident side reflecting mirror 971, an emitting side reflecting mirror 972, an intermediate lens 973 placed between these, and a focusing lens 954 disposed before the liquid crystal panel 925B. The distance of the optical path of each color light flux, i.e., the distance between the white light flux emitting portion of the integrator optical system to each of the liquid crystal light valves 925R, 925G, and 925B is longest for the blue light flux B, so that the amount of light lost is greatest for the blue light flux. However, the amount of light lost for the blue light flux can be reduced by introducing the light guiding system 927.

Next, the light fluxes of each color modulated by passing through the liquid crystal light valves 925R, 925G, and 925B of each color are cast into the color synthesizing optical system 910, and synthesized. In the present embodiment, a prism unit 910 that includes dichroic prisms as described above is used as the color synthesizing optical system. The color image re-synthesized is subjected to enlarged projection on the surface of a screen 100 by a projecting lens unit 6.

Liquid Crystal Light Valve Illumination Range Adjusting Mechanism

Regarding the projection-type display apparatus 1 in accordance with the present embodiment, as shown in FIG. 4, the illumination range on the liquid crystal light valve 925 from the integrator optical system 923 provides fine adjustment in the vertical (±Y direction) and horizontal (±X direction) directions as to the image forming range of the liquid crystal light valve.

FIG. 5(A) shows the relationship between the illumination range B on the liquid crystal light valve 925 from the integrator optical system 923 and the image formation range A of the liquid crystal light valve 925. Generally, the projecting range of the screen 100 is rectangular, so the image formation range A of the liquid crystal light valve 925 is correspondingly rectangular. The illumination range B from the uniform illumination optical system 923, i.e., the range illustrated by imaginary lines in the Figure, is also correspondingly rectangular.

As described above, the image formation range A of the liquid crystal light valve 925 is sized to be distinctly smaller than the illumination range B. In other words, a margin of a certain width is provided around the image formation range A. Providing for a margin enables the display range A to always be disposed within the illumination range B, even when the image formation position of the illumination range changes due to a margin of error in positioning the optical parts, such as each of the lens plates 921 and 922 of the integrator optical system 923.

In the present embodiment, as shown in the arrows in the Figure, the lens plates 921 and 922 are arranged so as to enable fine adjustment of the attachment position thereof in vertical and horizontal directions following a plate perpendicular to the optical axis la, by a position adjusting mechanism. A leaf spring and position adjusting screw can be used as the position adjusting mechanism.

FIGS. 6(A) and 6(B) are sectional views showing an example of a mechanism for providing fine adjustment of the attachment position of the lens plate 921 in the left and right directions. FIG. 6(B) is a cross-sectional diagram following the line S—S in FIG. 6 (A). As shown in the diagrams, the position adjusting mechanism 700 is provided at the upper and lower light guides 901 and 902. A pair of right and left walls 711 and 712 extending in the vertical direction following a plate vertical to the optical axis 1a, a base wall 713 connecting the lower edges of the vertical walls 711 and 712, and an upper wall 714 connecting the upper edges of the vertical walls 711 and 712, are formed by the upper and lower light guides 901 and 902, with the lens plate 921 being surrounded by the walls 711–714. The bottom end of the lens plate 921 is inserted into a holding groove 715 which is formed in the base wall 713. Also, the lower portion of the lens plate 921 is pressed toward the upstream direction of the optical path (−Z direction) by a fixed spring 717 which is mounted by a screw 716 to the base wall 713. The upper portion of the lens plate 921 is pressed in the same direction by a fixed spring 719 which is mounted by a screw 718 to the upper wall 714. The upper portion of the lens plate 921 contacts a protruding portion 710 which is provided at the upper wall 714. Accordingly, the lens plate 921 is supported by one of the vertical walls 711 via an alignment spring 720. Also, the lens plate 921 is pressed toward one of the vertical walls 711 by an adjusting screw 721 which is provided at the other vertical wall 712. Thus, the attachment position of the lens plate 921 can be moved only in the left and right directions (±X direction) by adjusting the adjusting screw 721.

As shown in FIG. 5(B), in cases wherein the illumination range B is offset in the horizontal direction as to the image formation range A of the liquid crystal light valve 925, and part of the image formation range A is not illuminated, the adjusting screw 721 can be tightened or loosened to provide fine adjustment of the attachment position of the lens plate 921 in the left and right direction, thus shifting the position of the illumination range B sideways, and as shown in FIG. 5(C), the illumination range B is made to encompass the image formation range A.

Also, with the present embodiment, an alignment spring 720 that includes a generally L-shaped leaf spring is used. The adjusting screw 721 presses the approximate center portion of the side of the lens plate 921 on the side of the vertical wall 712. Accordingly, uniform movement of the lens plate 921 can be realized with few parts.

On the other hand, a mechanism for providing fine adjustment of the attachment position of the lens plate 922 in the vertical directions (±Y direction), does not have to include the adjustment screw 721 and alignment spring 720 provided at the vertical walls 711 and 712 as shown in FIGS. 6(A) and 6(B). Instead, an adjustment screw and alignment spring can be provided at the upper wall 714 and lower wall 713, the same as described above to facilitate easy adjustment. Accordingly, detailed description thereof will be omitted.

Also, according to the present embodiment, subsequent to fine adjustment of the lens plates 921 and 922, adhesive agent is injected via adhesive agent injection holes 904a, 904b, 905a, and 905b shown in FIG. 3, provided in the upper light guide 901, thus fixing the lens plates 921 and 922. Such fixing is not necessarily required, but is advantageous as it can ensure the prevention of shifting of the attachment position of the lens plates 921 and 922 due to external shock.

Also, as for a position adjusting mechanism using an adjustment screw and alignment spring, an arrangement can be used wherein an adjustment screw and alignment spring are not provided directly to the upper and lower light guides 901 and 902, and instead a separate lens holder is used.

Further, the fine adjustment in the left and right directions (±X direction) can be made either automatically or manually, by measuring the illuminance on the area of the image formation range A on the liquid crystal light valve 925G. In the structure shown in FIG. 5(B), the illumination region B is shifted to the left, and the illuminance of the image formation range A on the right side of the liquid crystal light valve 925G is low. In order to adjust such offset of the illumination range B, the attachment position of the lens plate 921 should be shifted to the left or right (±X direction) until the right and left illuminance P1 and P2 of the image formation range A are of a constant value. However, this adjusting method requires that a constant value be set beforehand, which creates difficulty in dealing with a situation where the light source has been changed to such with low luminosity.

Since there is no need to set a constant value beforehand if the attachment position of the lens plate 921 is shifted to the left or right until the right and left illuminance P1 and P2 of the image formation range A are of an equal value, a situation where the light source has been changed to such with low luminosity can be dealt with easily. Also, since there is no need to set a constant value beforehand even if the attachment position of the lens plate 921 is shifted to the left or right until the sum of the right and left illuminance P1 and P2 of the image formation range A is maximal, a situation where the light source has been changed to such with low luminosity can be dealt with easily.

Instead of using the method wherein the illuminance in the area of the image formation range A on the liquid crystal light valve 925G is measured, the fine adjustment in the left and right directions (±X direction) can be performed automatically or manually, by setting the liquid crystal light valve 925G to transmit illumination light, and measuring the illuminance of the area around the projected image when the image is projected on the screen 100.

When projection is made to the screen 100 in the structure shown in FIG. 5(B), the projected image B is not projected to the left edge of the range A' to which the is image should be projected, as shown in FIG. 5(D). Accordingly, illuminance of the left edge becomes low. Thus, the illuminance Q1 and Q2 of the left and right portions of the range A' to which the image should be projected is measured, and fine adjustment can be made by a method similar to the aforementioned method wherein illuminance measurement is made on the liquid crystal light valve 925G. For example, the attachment position of the lens plate 921 is shifted to the left and right until the value of the illuminance Q1 and Q2 becomes constant, or the attachment position of the lens plate 921 is shifted to the left and right until the value of the illuminance Q1 and Q2 becomes equal, or further, the attachment position of the lens plate 921 is shifted to the left and right until the sum value of the illuminance Q1 and Q2 becomes maximal. Also, as described above, situations where the light source has been changed to such with low luminosity can be dealt with easily by shifting the attachment position of the lens plate 921 to the left and right until the value of the illuminance Q1 and Q2 becomes equal or until the sum value of the illuminance Q1 and Q2 becomes maximal.

Fine adjustment in the up and down directions (±Y direction) can be performed automatically or manually, by measuring the illuminance at the upper and lower portions of the image forming range A, or the illuminance at the upper and lower portions of the projected image. In the case of vertical adjustment, the attachment position of the lens plate 922 should be shifted in the vertical direction until the illuminance of two spots become a constant value, the same as with horizontal fine adjustment. Also, situations where the light source has been changed to such with low luminosity can be dealt with easily by shifting the attachment position of the lens plate 922 up and down until the illuminance of the two spots becomes equal or until the sum value of the two spots becomes maximal.

Further, fine adjustment of the integrator optical system 923 may be performed using the other liquid crystal light valves 925R or 925B instead of the liquid crystal light valve 925G.

When performing fine adjustment, the first lens plate 921 and the second lens plate 922 may be moved simultaneously, but a sequential attachment position fine adjustment method may be used. For example, the first lens plate 921 is first moved in the left and right directions to perform fine adjustment in the horizontal direction, and then the second lens plate 922 is second moved in the up and down directions to perform fine adjustment in the vertical direction. Of course, similar adjustment can be made wherein fine adjustment is made in the vertical direction, following fine adjustment in the horizontal direction.

While in the above example, the first lens plate 921 is first moved in the left and right directions to perform fine adjustment, and the second lens plate 922 in the up and down directions, but these directions may be reversed. Further, the only one of the first and second lens plates 921 and 922 can be made to be subjected to fine adjustment. Further, the attachment position of the first and second lens plates 921 and 922 may be made to be adjustable in any direction intersecting the optical axis. By enabling such adjustment in arbitrary directions, warping on the illumination range B shown in FIG. 7 can also be prevented, thus facilitating improved uniformity of illumination. The following four combinations are examples of adjustment forms of these.

Direction of Adjustment

First integrator lens Second integrator lens
(1) Horizontal Vertical
(2) Vertical Horizontal
(3) Fixed (non-adjustable) Vertical, Horizontal, or arbitrary
(4) Vertical, Horizontal, Fixed (non-adjustable) or arbitrary Thus, enabling fine adjustment of the attachment position of the integrator optical system obviates the need to provide a certain margin around the image formation area A of the liquid crystal light valve wherein shifting of the illumination range is taken into consideration beforehand, as with the conventional art. Accordingly, the margin to be provided around the image formation area A can be extremely small, thus providing increased effectiveness of the usage of illumination light and consequently increasing the brightness of the projected image.

In other words, even if the margin is reduced, the problem of a portion of the image formation area A extending beyond the illumination range B, as shown in FIG. 5(B), can be obviated by making fine adjustment of the attachment position of the lens plates 921 and 922. Hence, the invention prevents problems such as shadows forming on the edge of the projected image.

Further, another reason that the illumination range B of the integrator optical system 923 shifts from the image formation area A of the liquid crystal light valve is due to the margin of error of the attachment angle of the reflecting surface of the reflecting mirrors disposed in the optical path of the light fluxes of each color. The attachment angle of the reflecting surface of the reflecting mirror relative to the optical axis is 45°, but when this angle is shifted, a portion of the image formation area A may shift out of the illumination range B, as shown in FIG. 5(B). Further, as shown in FIGS. 7(A) and 7(B), this can result in warping of the illumination range B, causing non-uniformity in the illuminance of the left side of the illumination range B and the illuminance of the right side thereof, thus destroying the advantages of using the integrator optical system 923.

Particularly, with the projection-type display apparatus 1000 in accordance with the present embodiment, fine adjustment of the integrator optical system 923 is performed with the liquid crystal light valve 925G as a standard reference. However, if the attachment angles of the reflecting surfaces of the mirrors 943, 972, and 971 shown in FIG. 4 are not 45° relative to the optical axis, the illumination ranges of each will be offset as to the image forming area of the liquid crystal light valves 925R and 925B. Also, if the focusing lens 953 and the intermediate lens 973 are not attached to the predetermined attachment positions, the illumination range will be offset as to the image forming area of the liquid crystal light valve 925B.

Now, with the projection-type display apparatus 1000 in accordance with the present embodiment, in addition to the aforementioned fine adjustment of the integrator optical system 923, the angle of the reflecting surface of the mirror 943 which reflects the red light flux R toward the liquid crystal light valve 925R and the mirror 972 which reflects the blue light flux B toward the liquid crystal light valve 925B, as shown in FIG. 4, can be subjected to fine adjustment as to the incident optical axis around an axial line (following the arrows in FIG. 4) vertical to a plane including the incident optical axis and reflected optical axis. An angle adjusting mechanism for this reflecting mirror attachment angle can include a leaf spring and angle adjusting screw similar to that of the above described position adjusting mechanism for the integrator optical system 923.

FIGS. 8(A)–(C) show a mechanism for performing fine adjustment of the attachment angle of the reflecting mirror 972. FIG. 8(A) shows the holder plate 740 which holds the reflecting mirror 972. FIG. 8(B) shows the mechanism for performing fine adjustment of the attachment angle of the reflecting mirror 972 from the side of the upper light guide 901. FIG. 8(C) shows the mechanism for performing fine adjustment of the attachment angle of the reflecting mirror 972 from the T—T cross-sectional portion in FIG. 8(B).

As shown in these diagrams, the angle adjustment mechanism 730 has a holder plate 740, and the lower portion of the reflecting mirror 972 is held from the side thereof opposite to the side of the reflecting surface, by the holding members 746a and 746b provided at this holder plate 740. Also, the upper portion of the reflecting mirror 972 is fixed to the holder plate 740 by a clip 748. An axial portion 741 extends vertically and is formed at the central portion of the surface of this holder plate 740. This axial portion 741 is rotatably supported by the lower light guide 902. Accordingly, the reflecting mirror 972 can be rotated around the axial line 1b of the axial portion 741 via the holder plate 740, by only a predetermined amount. Also, a spring holder 744 is provided at the other side portion of the holder plate 740, and the first fulcrum 742a of the alignment spring 742 is inserted into this spring holder 744. The fulcrums 742b and 742c of the alignment spring 742 contact a supporting portion 749 provided at the lower light guide 902. Accordingly, the holder plate 740 is supported at the lower light guide 902 via the alignment spring 742. Further, the spring holder 744 of the holder plate 740 is pressed in the direction of arrow G in the Figure by an adjusting screw 743 provided at a plate 770 fixed to the lower light guide 902 by a screw 771.

Accordingly, inserting a jig from the screw operating portion 902a provided at the lower light guide 902 and increasing the amount of screwing of the adjusting screw 743 causes the side portion of the holder plate 740 to be pressed toward the direction G by the adjusting screw 743, so that the holder plate 740 circles around the axial line 1b of the axial portion 741 shown by arrow R1 in FIG. 8(B). Thus, the angle of the reflecting surface of the reflecting mirror 972 can be changed so that the incident angle of the incident light to the reflecting mirror 972 is increased.

Conversely, reducing the amount of screwing of the adjusting screw 743 causes the side portion of the holder plate 740 to be pulled toward the direction −G by the alignment spring 742, so that the holder plate 740 circles around the axial line 1b of the axial portion 741 shown by arrow R2 in FIG. 8(B). Thus, the angle of the reflecting surface of the reflecting mirror 972 can be changed so that the incident angle of the incident light to the reflecting mirror 972 is decreased. In other words, by adjusting the screwing amount of the adjusting screw 743, the angle of the reflecting surface of the reflecting mirror 972 can be adjusted around an axial line vertical to a plane including the incident optical axis and reflected optical axis. Incidentally, the mechanism for adjusting the angle of the reflecting surface of the other reflecting mirrors can use a mechanism the same as that described above.

Also, in accordance with the present embodiment, subsequent to fine adjustment of the attachment angle of the reflecting mirrors 943 and 972, adhesive agent is injected from adhesive agent injection holes 906a, 906b, 907a, and 907b (shown in FIG. 3) provided in the upper light guide 901, thus fixing the reflecting mirrors 943 and 972. Such fixing is not necessarily required, but is advantageous as it can ensure the prevention of shifting of the reflecting mirrors 943 and 972 due to external shock.

Further, this fine adjustment can be performed automatically or manually, by measuring the illuminance around the image forming range, on the liquid crystal light valve 925R or liquid crystal light valve 925B. As with the above-described fine adjustment of the lens plates, the attachment angle of each of the reflecting mirrors 943 and 972 should be shifted until the left and right illuminance P1 and P2 of the image formation range A are of a constant value. Also, situations where the light source has been changed to such with low luminosity can be dealt with by shifting the attachment angle of each of the reflecting mirrors 943 and 972 until the left and right illuminance P1 and P2 of the image formation range A are equal, or by shifting the attachment angle of the reflecting mirrors 943 and 972 until the sum of the left and right illuminance P1 and P2 of the image formation range A becomes maximal.

Now, regarding fine adjustment of each of the reflecting mirrors 943 and 972, as with the fine adjustment of the lens plates, instead of using the method wherein the illuminance in the area of the image formation range A on the liquid crystal light valve 925R or liquid crystal light valve 925B is measured, the fine adjustment can be performed automatically or manually, by setting the liquid crystal light valve 925R or liquid crystal light valve 925B to transmit illumination light, and measuring the illuminance of the area around the projected image when the image is projected on the screen 100. In other words, when projection is made to the screen 100 as shown in FIGS. 7(A) and 7(B), the illuminance of the left and right sides becomes non-uniform. To deal with this, the illuminance of the left and right sides of projected image is measured, and fine adjustment is made in the same manner as with the illumination measurement of the image forming range A, and the attachment angle of the reflecting mirrors 943 and 972 is shifted until the value of the left and right illuminance become constant, or the left and right illuminance become equal, the sum value of the left and right illuminance becomes maximal.

When performing fine adjustment, the reflecting mirrors 943 and 972 may be moved simultaneously. However, a sequential attachment angle adjustment method may be used wherein the reflecting mirror 943 is first moved to perform fine adjustment based on the projected image or image forming range from the liquid crystal light valve 925R, and then the reflecting mirror 972 is moved to perform fine angle adjustment based on the projected image or image forming range from the liquid crystal light valve 9253.

While in accordance with present embodiment, the attachment angle of the reflecting mirrors 943 and 972 closest to the liquid crystal light valves 925R and 925B can be adjusted, part or all of the other optical components, such as the blue reflecting dichroic mirror 941, green reflecting dichroic mirror 942, or the incident side reflecting mirror 971 may be subjected to fine adjustment of the attachment angles thereof. Also, the position of the intermediate lens 973 or focusing lens 953 may be subjected to adjustment instead of the reflecting mirror 972. However, the arrangement in accordance with the present embodiment, subjecting the attachment angle of the reflecting mirrors 943 and 972 closest to the liquid crystal light valves 925R and 925B to fine adjusting is most advantageous, from the perspective of apparatus construction and from the perspective of precision of angle adjustment.

Thus, providing fine adjustment of the attachment angle of the reflecting mirrors 943 and 972 obviates the need to provide a wide margin around the image formation area A of the liquid crystal light valve wherein shifting of the illumination range is taken into consideration beforehand, as with conventional art. Accordingly, the margin to be provided around the image formation area A can be extremely small, thus providing increased effectiveness of the usage of illumination light and consequently increasing the brightness of the projected image.

Also, even if the margin is reduced, the problem of a portion of the image formation area A extending beyond the illumination range B as shown in FIGS. 7(A) and 7(B) can be obviated by providing fine adjustment of the attachment angle of the reflecting mirrors 943 and 972. Hence, the invention prevents problems such as shadows forming on the edge of the projected image.

Further, by providing fine adjustment of the attachment angle of the reflecting mirrors 943 and 972, warping of the illumination range B can be eliminated, thus optimizing the merits of enabling uniform illumination with the integrator optical system 923, which facilitates obtaining of a projected image which is extremely uniform in brightness.

Also, such an angle adjusting mechanism for optical components such as reflecting mirrors is effective in projection-type display apparatuses which do not use an integrator optical system 923.

The following is a description of another structure of a projection-type display apparatus to which the invention has been applied. The optical system of the projection-type display apparatus 2000 in accordance with the invention includes a structure enabling a polarization illumination which includes an integrator optical system and a polarization beam splitter of a special form. In the present embodiment, the components which are the same as those in the above-described projection-type display apparatus 1000 are provided with the same reference numerals as those given in FIGS. 1–8, and detailed description thereof is omitted.

Figure 9:
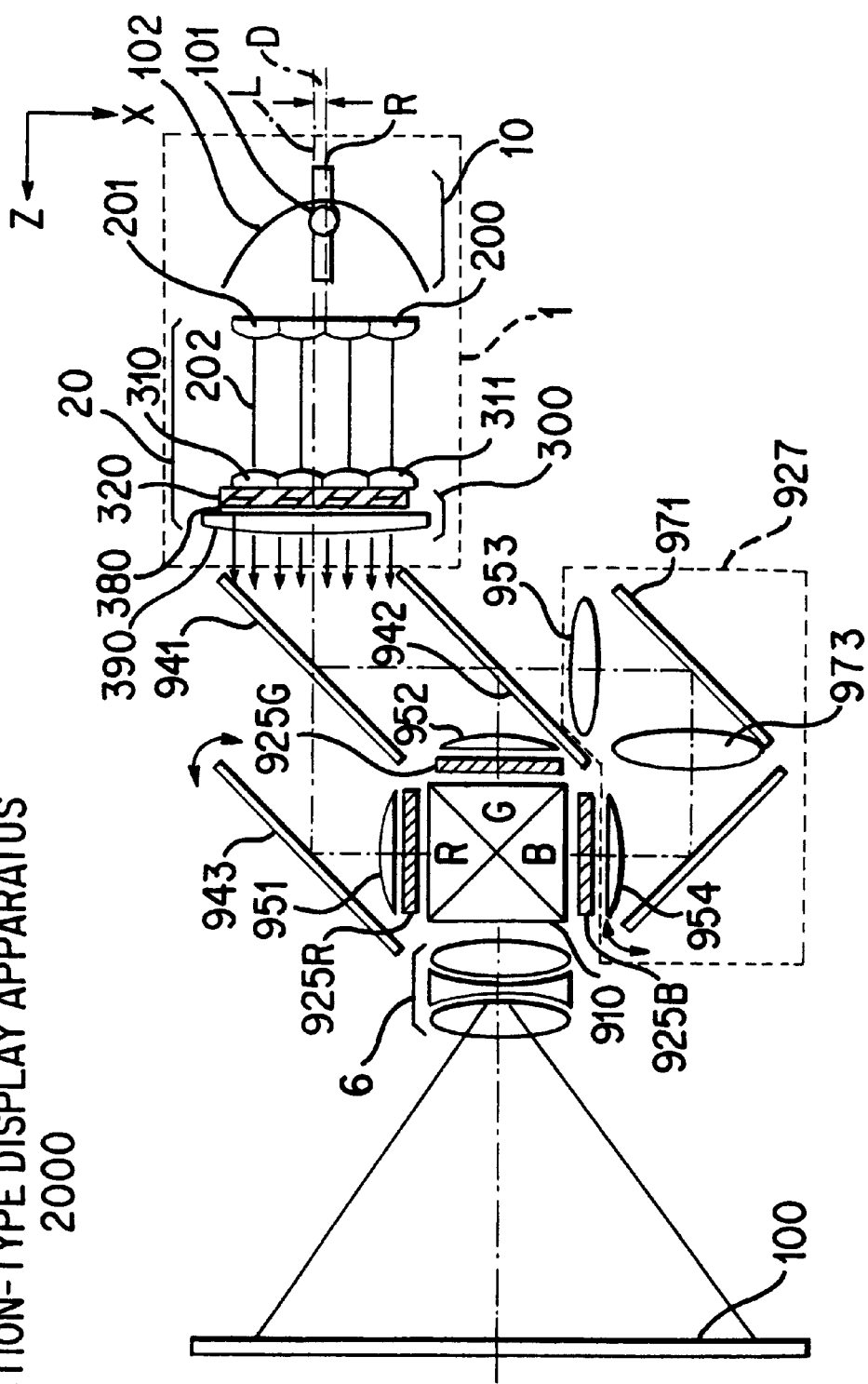
FIG. 9 is a schematic plan diagram of the principal components of another example of an optical system of the projection-type display apparatus in accordance with the invention.

FIG. 9 shows the principal components of the optical system of the projection-type display apparatus 2000 in accordance with the invention, illustrating the construction on an X-Z plane. The projection-type display apparatus 2000 in accordance with the invention generally includes a polarization illumination device 1, a color splitting device for splitting the white light flux into three colors, three transmittance-type liquid crystal devices for modulating the light of each color according to display information and forming a display image, a color synthesizing device for synthesizing the color light of the three colors and forming a color image, and a projecting optical system for projection display of the color image.

The polarization illumination device 1 includes a light source portion 10 for emitting random polarization light fluxes in a single direction. The random polarization light fluxes emitted from this light source portion 10 are converted into a polarization light flux of almost one type, by a polarization converting device 20.

The light source portion 10 generally includes a light source lamp 101 and a parabolic surface reflector 102. The light emitted from the light source lamp is reflected in one direction by the parabolic surface reflector 102, and is cast into the polarization converting device 20 as parallel light flux. Light source portion 10 is disposed so that the light source optical axis R of the light source portion 10 is shifted as to the system optical axis L in a parallel manner in the X direction by a constant distance of D.

The polarization converting device 20 includes a first optical component 200 and a second optical component 300.

The first optical component 200 is equivalent to the first lens plate 921 in the above-described projection-type display apparatus 1000, with the cross section on the X-Y plane including a matrix-like array of a plurality of rectangular light flux splitting lenses 201. The light source optical axis R is disposed so as to intersect the center of the first optical component 200. The light cast into the first optical component 200 is split into a plurality of intermediate light fluxes 202 by the light flux splitting lenses 201. At the same time, a number of focused images equal to the number of light flux splitting lenses are formed at a position at which the intermediate light fluxes are converged within a plane perpendicular to the system optical axis L (the X-Y plane shown in FIG. 9) by focusing effects of the light flux splitting lenses. Also, the cross-section of the light flux splitting lenses 201 on the X-Y plane is set so as to be analogous to the form of the image forming range of the liquid crystal light valves. In the present embodiment, the cross-section of the light flux splitting lenses 201 on the X-Y plane is set to be rectangular, since an image forming range is rectangular and long in the X direction on the X-Y plane.

The second optical component 300 is a complex member that generally includes a focusing lens array 310, a polarization splitting unit array 320, a selective phase difference plate 380, and a combining lens 390, being positioned near the position at which the focused image from the first optical component 200 is formed, within a plane perpendicular to the system light axis L (the X-Y plane shown in FIG. 9). Also, if the light flux being cast into the first optical component 200 has extremely good parallelism, the focusing lens array 310 can be omitted from the second optical component. This second optical component 300 can spatially split each of the intermediate light fluxes 202 into P-polarization light flux and S-polarization light flux, and then emit the P-polarization light flux and S-polarization light flux with the polarization direction of one matching the polarization direction of the other, and leading the light fluxes almost matched in direction to a single illumination range.

The focusing lens array 310 includes almost the same structure as that of the first optical component 200. For example, the focusing lens array 310 is a matrix array of focusing lenses 311 equal in number to the light flux splitting lenses 201 of the first optical component 200, which focus each of the intermediate light fluxes to a particular spot on the polarization splitting unit array 320. Accordingly, it is desirable that the lens properties of each of the focusing lenses be optimized, in accordance with the properties of the intermediate light fluxes 202 formed by the first optical component 200, and wherein it is ideal that the inclination of the main ray of the light incident to the polarization splitting unit array 320 be parallel to the system optical axis L. However, because of considerations of lowering costs of the optical system and of ease of design, an object exactly identical to the first optical component 200 can be used for the focusing lens array 310, or a focusing lens array that includes focusing lenses analogous to the form of the light flux splitting lenses 201 on the X-Y plane can be used as the focusing lens array. Thus, in accordance with the present embodiment, first optical component 200 is used for the focusing lens array 310. Further, the focusing lens array 310 may be separated from the polarization splitting unit array 320, i.e., to the side closer to the first optical component 200.

Figure 10A:
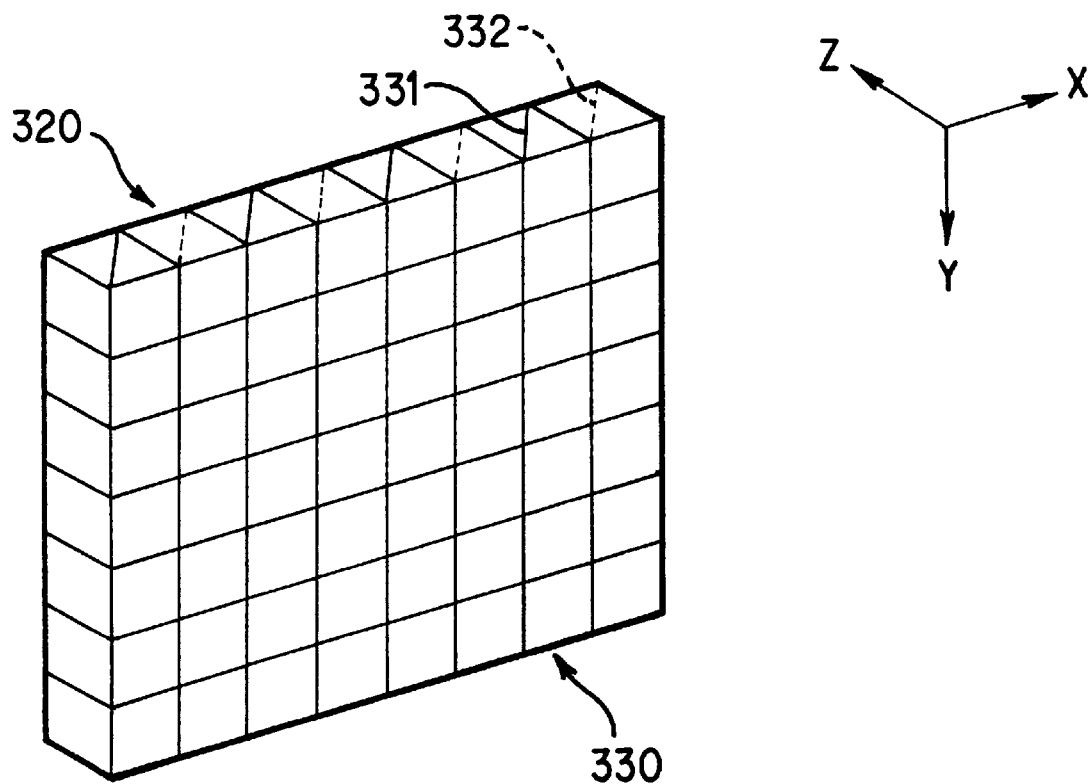
FIG. 10(A) is a perspective view showing the polarization splitting unit array shown in FIGS. 7(A) and 7(B)
Figure 10B:
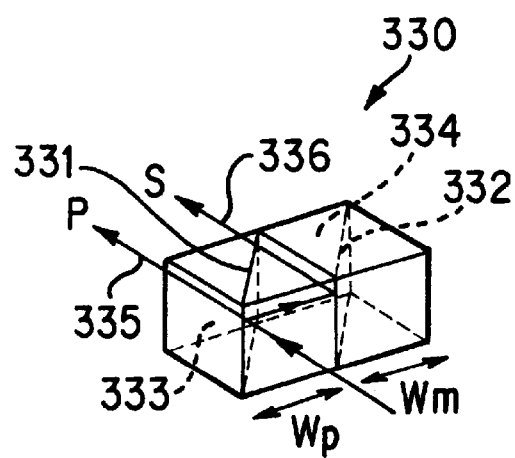
FIG. 10(B) is an explanatory diagram showing the splitting operation of polarization light flux by the aforementioned polarization splitting unit array.

As shown in FIGS. 10(A) and 10(B), the polarization splitting unit array 320 includes a plurality of polarization splitting units 330 arrayed on a matrix form. The arraying of the polarization splitting units 330 corresponds with the lens properties of the light flux splitting lenses 201 of the first optical component 200, and the arraying thereof. In accordance with the present embodiment, concentric light flux splitting lenses 201 which have all of the same lens properties are used. These light flux splitting lenses are arrayed in an orthogonal matrix form to form the first optical component 200. Thus, the polarization splitting unit array 320 includes polarization splitting units 330 arrayed in an orthogonal matrix form, all in the same direction. If the polarization splitting units arrayed in the Y direction are all identical polarization splitting units, it is advantageous to use a polarization splitting unit array 320 that includes polarization splitting units which are long and thin in the Y direction and arrayed on the X direction, from the perspective of reducing light lost at the surface between the polarization splitting units, and also from the perspective of facilitating manufacturing costs of the polarization splitting unit array.

The polarization splitting units 330 are integral having a pair of polarization light splitting surface 331 and reflecting surface 332 within, and spatially split each of the intermediate light fluxes cast into the polarization splitting unit into P-polarization light flux and S-polarization light flux. The cross-section form of the polarization light splitting units 330 on the X-Y plane is analogous with the cross-section form of the light flux splitting lenses 201 on the X-Y plane, i.e., a rectangular form which is long in the width direction. Accordingly, the polarization light splitting surface 331 and reflecting surface 332 are lined up in the sideways direction (X direction). Here, the polarization light splitting surface 331 and reflecting surface 332 are disposed such that the polarization light splitting surface 331 is at an inclination of approximately 45° to the system optical axis L, the reflecting surface 332 is parallel with the polarization splitting surface, and further, the area of the polarization light splitting surface 331 being projected upon the X-Y plane (equal to the area of the later-described P emission plane 333) is equal to the reflecting surface 332 being projected upon the X-Y plane (equal to the area of the later-described S emission plane 334).

Accordingly, in accordance with the present embodiment, the width Wp upon the X-Y plane of the range at which the polarization light splitting surface 331 extends and the width Wm upon the X-Y plane of the range at which the reflecting surface 332 extends are equal. Also, generally, the polarization light splitting surface 331 can be formed of a dielectric multi-layer film, and the reflecting surface 332 can be formed of a dielectric multi-layer film or aluminum film.

Incident light to the polarization splitting units 330 is split at the polarization light splitting surface 331 into P polarization light flux 335 which passes through the polarization light splitting surface 331 without changing direction and S polarization light flux 336 which is reflected at the polarization light splitting surface 331 and changes direction toward the reflecting surface 332. The P polarization light flux 335 is emitted from the polarization light splitting units without change via the P emission plane 333, and the S polarization light flux 336 changes direction again at the reflecting surface 332. The S polarization light flux 336 is parallel with the P polarization light flux 335, and is emitted from the polarization splitting units via the S emission plane 334. Accordingly, the random polarization light flux cast into the polarization splitting unit 330 is split into two types of polarization light fluxes, the P polarization light flux 335 and S polarization light flux 336. The P and S polarization light fluxes 335 and 336 have different polarization directions, and are emitted from different positions on the polarization splitting units (P emission plane 333 and S emission plane 334) toward the same general direction.

Since the polarization splitting units operate as described above, it is necessary to guide each of the intermediate light fluxes 202 to the range where the polarization light splitting surface 331 extends within the polarization splitting units 330. To this end, the positional relationship of each of the focusing lenses 311 of each of the polarization light splitting surface 331 and the lens properties of each of the focusing lenses 311 are set so that the intermediate light fluxes are cast to the center portion of the polarization light splitting surface within the polarization splitting units. Particularly, in accordance with the present embodiment, the focusing lens array 310 is shifted in the X direction as to the polarization splitting unit array 320 by a distance corresponding to ¼ of the width W of the polarization splitting units, so that the center axis of each of the focusing lenses is positioned at the center portion of the polarization light splitting surface 331 within the polarization splitting units 330.

Again, description is made with reference to FIG. 9. A selective phase difference plate 380 that includes methodically arrayed ½ phase difference plates is disposed on the emitting side of the polarization light splitting unit array 320. For example, ½ phase difference plates are arrayed only at the portion of the P emission plane 333 of the polarization splitting units 330 of the polarization splitting unit array 320, and ½ phase difference plates are not provided at the S emission plane 334 portion. Because of the position of the ½ phase difference plates, the P polarization light fluxes emitted from the polarization splitting units 330 receive the rotational effects of the polarization direction when passing through the ½ phase difference plates and are converted into S polarization light fluxes. On the other hand, since the S polarization light fluxes emitted from the S emission plane 334 portion do not pass through the ½ phase difference plates, there is no change in polarization direction, and pass through the selective phase difference plate 380 unchanged, as S polarization light fluxes. In other words, due to the polarization splitting unit array 320 and selective phase difference plate 380, the intermediate light fluxes of random polarization direction are converted into a type of polarization light flux (in this case, S polarization light flux).

A combining lens 390 is disposed at the emitting side of the selective phase difference plate 380, and the light flux arranged to be S polarization light flux by the selective phase difference plate 380 is led to the illumination range of each liquid crystal device by combining lens 390, and is superimposed on the illumination range. This combining lens 390 is equivalent to the second lens plate 922 in the above-described projection-type display apparatus 1000. The combining lens 390 does not have to be a single lens member, and instead can be a collection of a plurality of lenses, as with the first optical component 200 of the second lens plate 922 in the projection-type display apparatus 1000.

Stating the functions of the second optical component 300 concisely, the intermediate light fluxes 202 split by the first optical component 200, i.e., the image plane cut out by the light flux splitting lenses 201, are superimposed on the illumination range by the second optical component 300. At the same time, the random intermediate light fluxes are spatially split by the encountered polarization splitting unit array 320, and converted into polarization light flux of almost one type upon passing through the selective phase difference plate 380. Accordingly, the image forming range of the liquid crystal light valve is illuminated almost uniformly by polarization light flux of almost one type.

As described above, the polarization illumination device 1 in accordance with the invention is advantageous in that the random intermediate light fluxes emitted from the light source portion 10 are converted into polarization light flux of almost one type by the polarization converting device 20 that includes a first optical component 200 and a second optical component 300. Thus, the image forming range of the liquid crystal light valve is illuminated almost uniformly by the light flux with matched polarization direction. Also, almost all of the light emitted from the light source portion can be introduced to the image forming range of the liquid crystal light valves since there is very little light loss in the process of generating polarization light flux. Accordingly, the invention provides the advantage of extremely high light usage efficiency.

Also, in accordance with the present embodiment, the focusing lens array 310, polarization splitting unit array 320, selective phase difference plate 380, and combining lens 390, of the second optical component 300 are optically integrated, which further lessens light loss at the surfaces thereof and increases light usage efficiency even more.

Further, matching the form of the image forming range which is a rectangular and long in the width direction, the light flux splitting lenses 201 of the first optical component 200 are rectangular and long in the width direction, and at the same time, of a form which splits the two types of polarization light fluxes emitted from the polarization splitting unit array 320 in the sideways direction (X direction). Thus, even in the event of illuminating an image forming range which is rectangular and long in the width direction, no light is wasted, and the illumination efficiency (light usage efficiency) is increased.

Generally, if light flux with random polarization direction is simply split into P-polarization light flux and S-polarization light flux, the overall width of the light flux subsequent to splitting is increased twofold, and the optical system accordingly becomes large. However, in accordance with the polarization illumination device 1 of the invention, a plurality of fine focused images are formed by the first optical component 200, and the space without light generated in the forming processes is optimally used for placing the reflecting surface 332 of polarization splitting units 330 in that space, thus absorbing the sideways spreading of the light flux due to splitting into the two polarization light fluxes, so that the width of the overall light flux does not spread, consequently providing the advantage that a small optical system can be realized.

According to the projection-type display apparatus 2000 thus using the polarization illumination device 1, a type of liquid crystal device is used which modulates one type of polarization light flux. Accordingly, if a conventional illumination device is used and random polarization light flux is introduced to the liquid crystal device, approximately half of the light of the random polarization light flux is absorbed by the polarization plate (not shown) and is changed into heat, resulting in problems such as poor efficiency of light usage. Also, a large and noisy cooling device is necessary to suppress the heat generated by the polarization plate. However, these problems have been improved greatly by the projection-type display apparatus 2000 in accordance with the invention.

In the polarization illumination device 1 of the projection-type display apparatus 2000 in accordance with the invention, rotation effect of the polarization surface by the ½ phase difference plate is provided to one of the polarization light fluxes, e.g., to only the P-polarization light flux, thus aligning this light flux with the other polarization light flux, e.g., the S-polarization light flux. Consequently, polarization light flux of almost one type with aligned polarization direction is introduced to the three liquid crystal light valves 925R, 925G, and 925B, the polarization plate absorbs very little light, and accordingly, efficiency of the light usage is improved and a bright projected image is obtained.

Further, in the second optical component 300, the polarization illumination device 1 spatially splits two types of polarization light flux in the sideways direction (X direction). Accordingly, light is not wasted, and the arrangement is advantageous for illuminating the liquid crystal devices that are rectangular and long in the width direction Further, with the polarization illumination device 1 in accordance with the present embodiment, spreading of the width of the light flux emitted by the polarization splitting unit array 320 is suppressed, even though a polarization conversion optical component is incorporated into the structure. This indicates that there is practically no light incident to the liquid crystal devices having a great angle, upon illumination of the liquid crystal devices. Accordingly, a bright projection image can be produced even without using an extremely wide-diameter projection lens with a small f-stop number. As a result, a projection-type display apparatus that is small in size can be provided.

In accordance with the projection-type display apparatus 2000 of the present embodiment having the above-described structure, placing at least one of the first optical component 200 and second optical component 300 contained in the polarization illumination device 1 so that the position thereof is adjustable in the direction orthogonally intersecting the light axis L, enables fine adjustment of the illumination range of each of the liquid crystal light valves 925R, 925G, and 9252 toward the front, rear, left, and right directions, thus facilitating positioning of the image forming range of each liquid crystal device within the illumination range at all times.

An example of a mechanism whereby the attachment position of the second optical component 300 is subjected to fine adjustment in the vertical direction (±Y direction) is described below. FIGS. 11(A) and 11(B) are sectional views showing a mechanism for providing fine adjustment of the attachment position thereof in the vertical direction. FIG. 11(B) is a cross-sectional view following line V—V in FIG. 11(A).

As shown in the diagrams, the position adjusting mechanism 750 is provided above and below. A pair of right and left vertical walls 761 and 762 that extend in the vertical direction and follow a plate vertical to the optical axis la, a base wall 763 connecting the lower edges of the vertical walls 761 and 762, and an upper wall 764 connecting the upper edges of the vertical walls 761 and 762, are formed by the upper and lower light guides 901 and 902, with the second optical component 300 being surrounded by the walls 761–764. The second optical component 300 is pressed against the other vertical wall 762 by a fixing spring 769 mounted between the one vertical wall 761, which defines the left and right (±X direction) attachment position. The bottom end of the second optical component 300 is inserted into a holding groove 768 which is formed in the base wall 763. Also, the lower portion of the second optical component 300 is pressed toward the upstream direction of the optical path (−Z direction) by a fixed spring 783 mounted by a screw 781 to the base wall 713. The upper portion of the second optical component 300 is pressed in the same direction by a fixed spring 782 mounted by a screw 780 to the upper wall 764. Further, the upper portion of the second optical component 300 contacts a protruding portion 767 provided at the upper wall 764. The Z direction of the attachment position of the second optical component 300 is thereby defined.

On the other hand, the second optical component 300 is supported by the base wall 763 via an alignment spring 765, and is pressed downwards (+Y direction) by an adjusting screw 766 provided at the upper wall 764. Thus, the second optical component 300 can be moved in the up and down directions (±Y direction) by adjusting the adjusting screw 766. Accordingly, in the event that the illumination region B shifts lengthwise as to the image forming range A of the liquid crystal light valve 925, and that part of the image forming range A is not illuminated, the adjustment screw 766 can be tightened or loosened thus providing fine adjustment in the vertical direction of the attachment position of the second optical component 300. The illumination region B is thereby shifted lengthwise and the illumination region B is disposed within the image forming range A.

Subsequently, adhesive agent is injected from adhesive agent injection holes 908a and 908b provided in the upper light guide 901, to fix the second optical component 300. Such fixing is not necessarily required, but is advantageous since it can ensure the prevention of the attachment position of the second optical component 300 from shifting due to external shock.

Also, a mechanism for providing fine adjustment of the attachment position of the first optical component 200 and second optical component 300 in the left and right directions (±X direction), can include a position adjusting mechanism provided with an adjusting screws and alignment spring, as shown in FIG. 6.

Also, regarding a position adjusting mechanism using an adjustment screw and alignment spring, an adjustment screw and alignment spring do not have to be provided directly to the upper and lower light guides 901 and 902, and instead a separate lens holder can be used.

Further, in the present embodiment, the position adjusting mechanism of each of the above-described optical devices, the adjustment method thereof, and the effects obtained by adjusting the illumination range are the same as those of the above-described projection-type display apparatus 1000.

Thus, in accordance with the projection-type display apparatus 2000 of the present embodiment, providing fine adjustment of the attachment position of the first optical component 200 and second optical component 300 obviates the need to provide a wide margin around the image formation area of the liquid crystal devices, as with conventional art, taking shifting of the illumination range into consideration. Accordingly, the margin to be provided around the image formation area can be extremely small, thus increasing the effectiveness of the illumination light usage and consequently increasing the brightness of the projected image.

Also, even if the margin is reduced, the problem of a portion of the image formation area of the liquid crystal device extending beyond the illumination range of the polarization illumination device can be obviated, by providing fine adjustment of the attachment angle of each of the above optical components. Hence, the invention prevents problems such as shadows forming on the edge of the projected image.

Also, in accordance with the present embodiment, the focusing lens array 310, polarization splitting unit 320, selective phase difference plate 380, and combining lens 390, of the second optical component 300 are optically integrated, which lessens light loss occurring at the surfaces thereof, but these devices do not necessarily have to be integrated. In the event that these devices are not integrated, simply adjusting the position of the focusing lens 310 enables the formation position of the illumination range to be adjusted.

In accordance with the projection-type display apparatus 2000 of the present embodiment, the illumination range of the liquid crystal device of the polarization illumination device 1 shifts relative to the image forming range of the liquid crystal device because of the margin of error of the attachment angle of the reflecting surface of the reflecting mirrors placed in the optical paths of the light fluxes of each color. The attachment angle of the reflecting surface of the reflecting mirror to the optical axis is 45°, but when this angle is shifted, a portion of the image formation area can shift out of the illumination range, as shown in FIGS. 7(A) and 7(B), possibly resulting in warping of the illumination range, which causes the illumination range to shift out of the image forming range of the liquid crystal device. Also, if such warping in the illumination range occurs, the illuminance at the left side and the illuminance at the right side become uneven, which prevents the advantages of using the polarization illumination device 1.

The projection-type display apparatus 2000 of the present embodiment not only provides for the aforementioned fine adjustment of each of the optical components of the aforementioned polarization illumination device 1, but also the angles of the reflecting surfaces of the reflecting mirrors 943 and 972 which are disposed in the optical paths of the light fluxes of each color can be subjected to fine adjustment as to the incident optical axis around an axial line (following the arrows in FIG. 9) vertical to a plane including the incident optical axis and reflected optical axis. Also, the attachment position of the intermediate lens 973 attached between the reflecting mirrors 971 and 972 can be adjusted vertically and horizontally. An angle adjusting mechanism for the attachment angle of the reflecting surface of the reflecting mirror is described with reference to FIG. 8.

Although transmittance-type liquid crystal light valves are used for the liquid crystal light valves 925R, 925G, and 925B in the above-described two examples, the invention can also be applied to projection-type display apparatuses using reflectance-type liquid crystal devices. Accordingly, the following is a description of one example of a projection-type display apparatus using reflectance-type liquid crystal light valves instead of transmittance-type liquid crystal light valves in the above-described projection-type display apparatus 2000. In the projection-type display apparatus 3000 of the present invention, the components which are the same as those in the above-described projection-type display apparatus 2000 are provided with the same reference numerals as those of FIGS. 9–11, and detailed description thereof is omitted.

Figure 12:
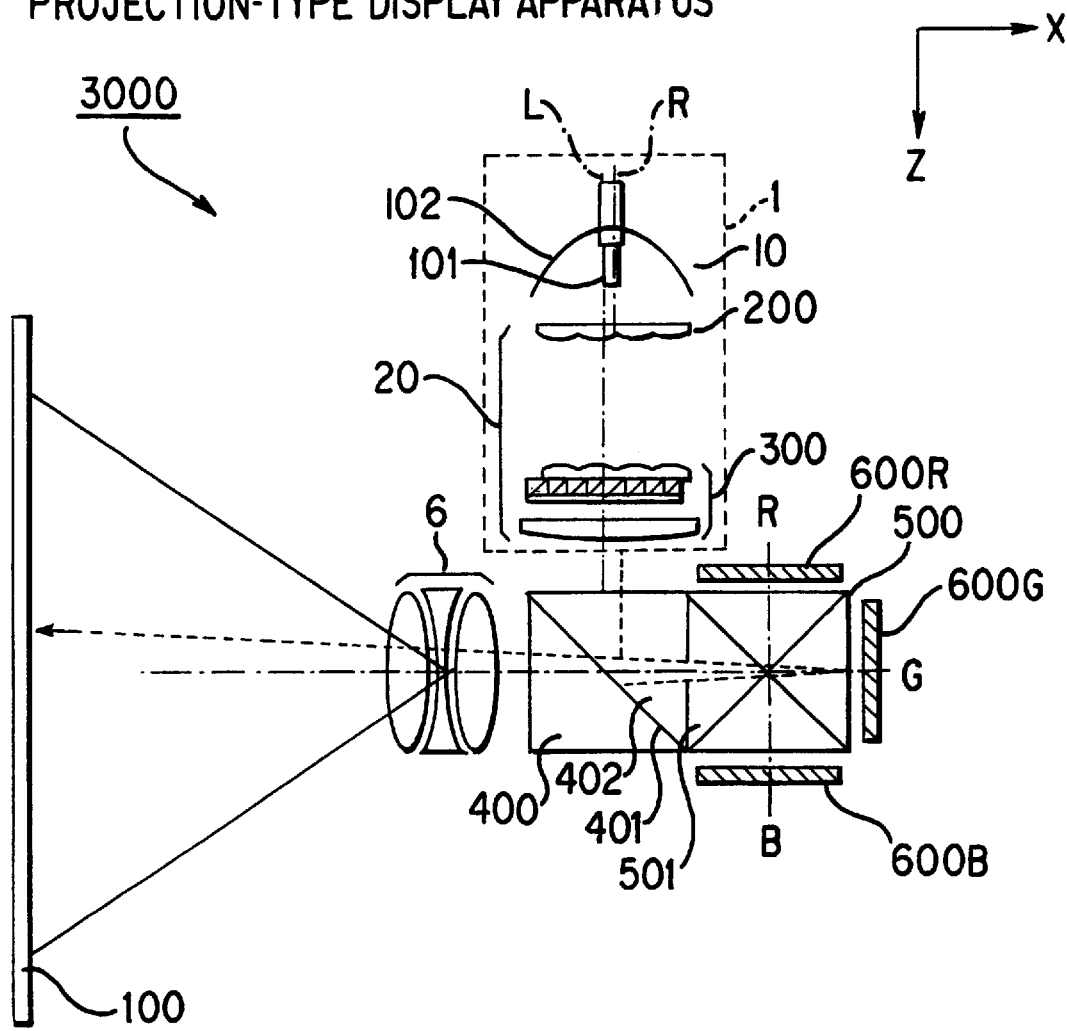
FIG. 12 is a schematic plan diagram of the principal components of yet another example of an optical system of the projection-type display apparatus in accordance with the invention.

FIG. 12 shows the principal components of the optical system of the projection-type display apparatus 3000 in accordance with the invention. FIG. 12 is a cross-sectional view on the X-Z plane passing through the center of the second optical component 300.

The polarization beam splitter 400 includes a prism having an S-polarization light flux reflecting surface 401 which reflects S-polarization light flux at approximately 45° and allows transmittance of P-polarization light flux. Since the light flux emitted from the second optical component 300 is light flux which has been converted in one type of polarization direction, almost all of the light flux is either reflected or transmitted by the polarization beam splitter 400. In accordance with the present embodiment, the light flux emitted from the second optical component 300 is S-polarization light flux, this S-polarization light flux being bent 90° by the S-polarization light flux reflecting surface 401 and cast into a prism unit 500 wherein dichroic films have been adhered one to another in an X-like form, wherein the light flux is separated into the three colors, R, G, and B. Each of the separated light components is cast into reflectance-type liquid crystal devices 600R, 600G, and 600B, which are provided following the three sides of the dichroic prism 500. The light flux cast into the reflectance-type liquid crystal devices 600R, 600G, and 600B is modulated by the reflectance-type liquid crystal devices 600R, 600G, and 600B.

Figure 13:
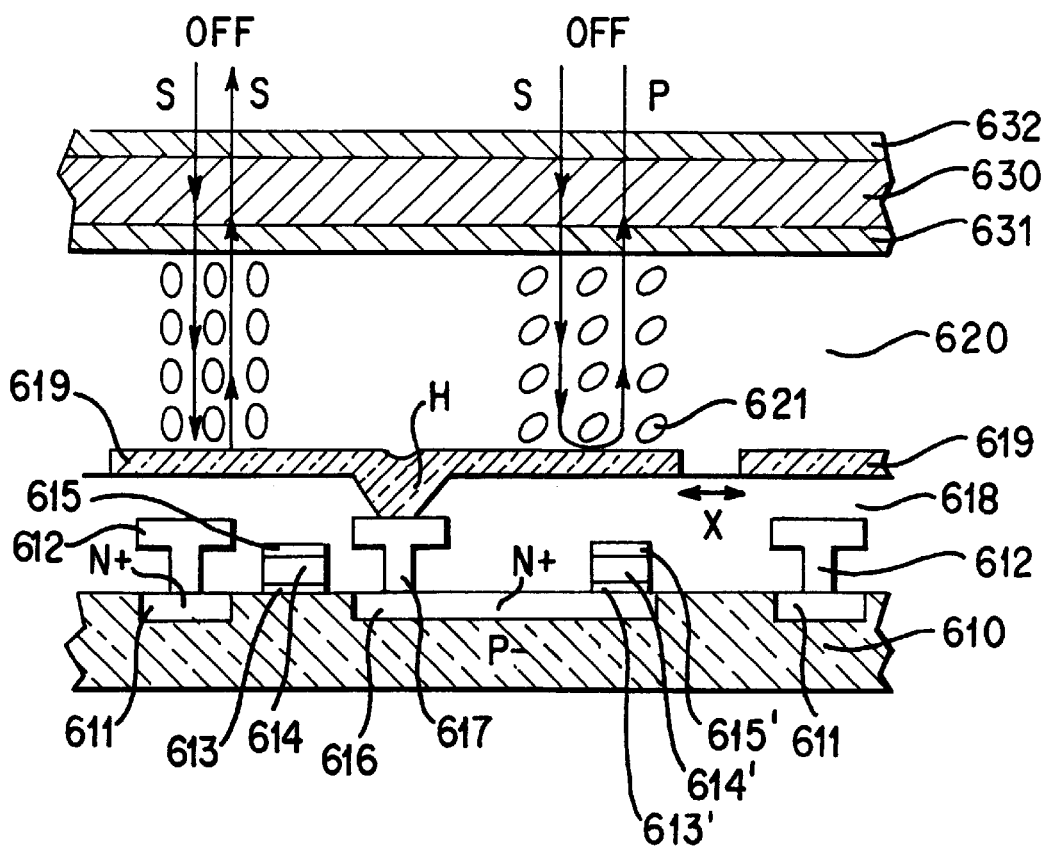
FIG. 13 is an explanatory diagram showing the operation of the reflectance-type liquid crystal device shown in FIG. 9.
Figure 14:
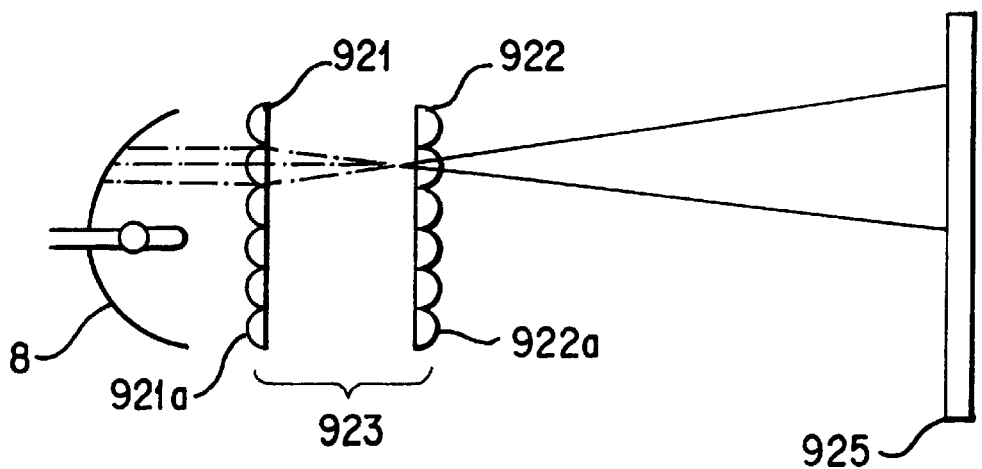
FIG. 14 is a schematic drawing showing the optical system of a general projection-type display apparatus provided with an integrator optical system.
Figure 15:
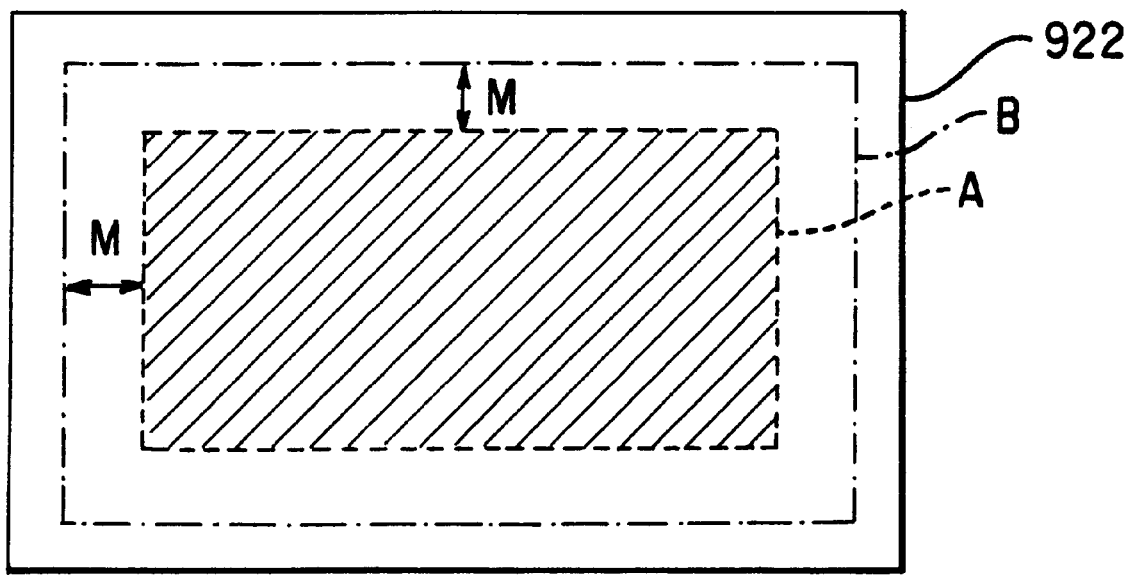
FIG. 15 is an explanatory diagram showing the relationship between the illumination range on the liquid crystal light valves and the image forming range.

FIG. 13 shows an example of the reflectance-type liquid crystal devices 600R, 600G, and 600B. The reflectance-type liquid crystal devices 600R, 600G, and 600B are active-matrix type liquid crystal devices, wherein TFT switching devices are connected to each of the devices arrayed in a matrix, and a liquid crystal layer 620 is sandwiched between a pair of substrates, 610 and 630. The substrate 610 is formed of silicone, and formed to a portion thereof is the source 611 and drain 616. Also, formed upon the substrate 610 are a source electrode 612 and drain electrode 617 formed of an aluminum layer, channels formed of silicone dioxide layer 613, gate electrodes formed of a silicone layer 614 and a tantalum layer 615, inter-layer insulating film 618, and a reflectance picture element electrode 619 formed of an aluminum layer, wherein the drain electrode 617 and reflectance picture element electrode 619 are electrically connected by a contact hole H. Since the reflectance picture element electrode 619 is non-transparent, it can be laid over the gate electrode, source electrode 612, and drain electrode 617 via the inter-layer insulating film 618. Since the distance X between the neighboring reflectance picture element electrodes 619 can be quite small, the opening ratio can be great, so that the projected image can be bright. Incidentally, in the present embodiment, holding capacity is provided that includes drain 616, silicone dioxide layer 613', silicone layer 614', and tantalum layer 615.

On the other hand, an opposing electrode 631 which is formed of ITO is disposed on the surface of one side of the opposing substrate 630 adjacent to the liquid crystal layer 620. An anti-reflection layer 632 is disposed on the other surface of the opposing substrate 630. The liquid crystal layer 620 of the present embodiment is such that the liquid crystal molecules 621 are vertically aligned when OFF-voltage is applied (OFF-state), and the liquid crystal molecules 621 exhibit super homeotropic orientation and twist 90° when ON-voltage is applied (ON-state). Accordingly, as shown in FIG. 4, the S-polarization light flux which is cast to the reflectance-type liquid crystal devices 600R, 600G, and 600B from the polarization beam splitter 400 when OFF-voltage is applied is returned from the reflectance-type liquid crystal devices 600R, 600G, and 600B to the polarization beam splitter 400 without any change in the polarization direction thereof. Thus, the S-polarization light flux is not reflected by the S-polarization light flux reflecting surface 401 and does not reach the side of the projecting lens unit 6. On the other hand, the S-polarization light flux cast to the reflectance-type liquid crystal devices 600R, 600G, and 600B from the polarization beam splitter 400 when voltage (ON) is applied becomes P-polarization light flux with the polarization direction thereof changed due to twisting of the liquid crystal molecules 621, is transmitted through the S-polarization light flux reflecting surface 401, and is subsequently projected onto the screen 100 via the projection lens unit 6.

The following description is made with reference to FIG. 12. The light flux modulated by the reflectance-type liquid crystal devices 600R, 600G, and 6002 is synthesized by the prism unit 500, and is subsequently projected onto the screen 100 via the polarization beam splitter 400 and projection lens unit 6.

Also, in accordance with the projection-type display apparatus 3000 of the present embodiment as well, making the attachment position of the first optical component 200 and second optical component 300 of the polarization converting device 20 of the polarization illumination device 1 to be movable vertically and horizontally in directions orthogonally intersecting the light axis enables the illumination range of the liquid crystal devices of this polarization illumination device 1 to be adjusted into the appropriate position and form. The position adjusting mechanism of the above-described position-adjustable optical components, the adjustment method thereof, and the effects and so forth obtained by adjusting the illumination range are the same as those of the above-described projection-type display apparatus 2000.

Also, in accordance with the projection-type display apparatus 3000 of the present embodiment, not only can the same effects of the other two projection-type display apparatuses described above be obtained other than by adjustment of the illumination area, but the following effects can also be obtained. Since the color separating device and the color synthesizing device are incorporated in a single prism unit, the optical path can be made to be extremely short. Also, since the opening ratio of the liquid crystal device is great, loss of light can be prevented. Accordingly, a bright projected image can be obtained even without using a projecting lens with a great diameter. Further, by using the first optical component and second optical component, polarized light flux which is uniform in brightness and without irregularity can be obtained as illumination light, and thus a projected image can be obtained which is extremely uniform over the display surface and the overall projection surface is also extremely bright.

Further, while in the present embodiment, reflectance-type liquid crystal devices 600R, 600G, and 600B are used as reflectance-type modulating devices, reflectance-type modulating devices other than liquid crystal devices can also be used, and the structure thereof, the materials of each component, and the operation mode of the liquid crystal layer 620 are not limited to that of the above-described example.

Further, forming the prism 402 of the polarization beam splitter 400 and the prism 501 of the prisms unit 500 as a single prism prevents light loss at these borders, further increasing efficiency of light usage.

Although the above-described three examples are fine adjustment mechanisms for optical components in projection-type display apparatuses capable of projecting color images, such fine adjustment mechanisms can also be applied to projection-type display apparatuses which are arranged to project monochrome images.

Also, the arrangement of the optical system is not restricted to the above described examples either, and altering the arrangement of the devices does not necessarily obviate the advantages of the invention.

Further, regarding projection-type display apparatuses, there are rear projection-type display apparatuses which project images from the opposite side of the observation side of the screen, in addition to the frontal projection type display apparatuses described in the present embodiment wherein images are projected from the observation side of the screen. The present invention is also applicable to such rear-projection types.

As described above, the projection-type display apparatuses in accordance with the invention provide fine adjustment of the attachment position of each of the lens plate of the integrator optical system. In addition to, or instead of this fine adjustment, the invention provides fine adjustment of the attachment angle of the reflecting device provided on the optical path extending from the light source to the modulation device. Accordingly, the formation position of the illumination range of illuminating light illuminating the modulating device can be subjected to fine adjustment in the direction vertical to the optical axis, and thereby the image forming position of the illumination range can be set so as to include the image forming range of the modulation device at all times.

Thus, there is no need to provide a wide margin around the image formation area, taking shifting of the illumination range from the image forming range of the modulation device into consideration. Accordingly, effectiveness of the illumination light usage can be increased, consequently improving the brightness of the projected image. Also, the illumination range of illumination light is formed so as to include the image forming range, which obviates problems such as shadows forming on the edge of the projected image.

What is claimed is:

1. A projector having an optical axis, comprising:
   a light source emitting light flux;
   a modulating device for modulating the light flux emitted from said light source in accordance with image signals;
   projecting lens unit for performing enlarged projection of said light flux modulated by said modulating device upon a projection surface;
   a first lens plate and a second lens plate, each of which include a plurality of lenses arrayed in matrix-form disposed in the optical path between said light source and said modulating device;
   wherein at least one of said first and second lens plates is arranged so that any attachment position thereof is adjustable in a direction intersecting the optical axis.

2. The projector according to claim 1, further including a reflecting device disposed in the optical path between said light source and said modulating device, said reflecting device arranged such that an angle of attachment relative to the incident optical axis is adjustable.

3. The projector according to claim 1, further including:
   a color separating optical system for separating light emitted from said second lens plate into light flux of each color;
   a plurality of modulating devices for modulating said light flux of each color separated by said color separating optical system;
   a color synthesizing system for synthesizing the light flux of each color modulated by said plurality of modulating devices; and
   a reflecting device disposed in the optical path between said light source and at least one of said plurality of modulating devices, and arranged such that an angle of attachment relative to the incident optical axis is adjustable;
   wherein the modulated light flux synthesized by said synthesizing system is projected on the projection surface via said color projecting lens unit.

4. The projector according to claim 3, wherein the attachment angle of said reflecting device positioned closest to said modulating device is adjustable.

5. The projector according to claim 3, wherein said modulating device is of a reflection type, and said color separating optical system and said color synthesizing optical system are incorporated into the same optical system.

6. A projector having an optical axis, comprising:
   a light source emitting light fluxes;
   a first optical component for splitting the emitted light fluxes from said light source into a plurality of intermediate light fluxes, the intermediate light fluxes being focused at a position;
   a second optical component disposed in proximity to the position at which said intermediate light fluxes are focused;
   a modulating device for modulating the light flux emitted from said second optical component; and
   projecting lens unit for performing enlarged projection of said light flux modulated by said modulating device upon a projection surface;
   wherein said second optical component includes:
   a focusing lens array for focusing each of the plurality of intermediate light fluxes split by said first optical component;

a polarization converting device which spatially splits each of the plurality of intermediate light fluxes focused by said focusing lens array into P-polarization light flux and S-polarization light flux, and emits the P-polarization light flux and S-polarization light flux with the polarization direction of one matching the polarization direction of the other; and a combining lens for superimposing the light fluxes emitted from said polarization converting device; and wherein at least one of the first optical component and second optical component is arranged so that an attachment position thereof is adjustable in a direction intersecting the optical axis.

7. The projector according to claim 6, wherein said focusing lens array, said polarization converting device, and said combining lens are integrated.

8. The projector according to claim 7, further including:
a color separating optical system for separating the emitted light from said second optical component into a plurality of light fluxes, each light flux having a different color;
a plurality of modulating means for modulating each of said light fluxes separated by said color separating optical system;
a color synthesizing system for synthesizing each of said light fluxes modulated by said plurality of modulating means; and
a reflecting device disposed in the optical path between said light source and at least one of said plurality of modulating means, and arranged such that an angle of attachment relative to the incident optical axis is adjustable;
wherein the modulated light flux synthesized by said color synthesizing system is projected on the projection surface via said projecting means.

9. The projector according to claim 8, wherein the attachment angle of said reflecting device positioned closest to said modulating device is adjustable.

10. The projector according to claim 8, wherein said modulating device is of a reflection type, and wherein said color separating optical system and said color synthesizing optical system are incorporated into the same optical system.

11. A projector having an optical axis, comprising:
a light source emitting light flux;
a modulating device for modulating light flux emitted from said light source in accordance with image signals;
a projecting lens unit for performing enlarged projection of said light flux modulated by said modulating device upon a projection surface;
a first lens plate and a second lens plate each of which include a plurality of lenses arrayed in matrix-form disposed in the optical path between said light source and said modulating device; and
an adjusting mechanism for adjusting an attachment position of at least one of said first and second lens plates in a direction intersecting the optical axis.

12. The projector according to claim 11, further including:
a first adjusting mechanism for adjusting said first lens plate in a first direction orthogonally intersecting said optical axis; and
a second adjusting mechanism for adjusting said second lens plate in a second direction orthogonally intersecting said optical axis and said first direction.

13. The projector according to claim 12, said adjusting mechanism further including:
a spring provided at a first side of said lens plate for pressing said first side; and
a screw provided at a second side of said lens plate opposing said first side thereof, for pressing said second side.

14. The projector according to claim 13, wherein said spring is a leaf spring, and said screw presses the approximate center of said second side.

15. A projector having an optical axis, comprising:
a light source emitting light fluxes;
a first optical component for splitting the emitted light fluxes from said light source into a plurality of intermediate light fluxes, the intermediate light fluxes being focused at a position;
a second optical component placed in proximity to the position at which said intermediate light fluxes are focused, said second optical component including: a focusing lens for focusing each of the plurality of intermediate light fluxes split by said first optical component; a polarization converting device which spatially splits each of the plurality of intermediate light fluxes focused by said focusing lens array into P-polarization light flux and S-polarization light flux, and emits the P-polarization light flux and S-polarization light flux with the polarization direction of one matching the polarization direction of the other; and a combining lens for superimposing the light fluxes emitted form said polarization converting device;
modulating device for modulating light flux emitted form said second optical component;
projecting lens unit for performing enlarged projection of said light flux modulated by said modulating device upon a projection surface; and
an adjusting mechanism for adjusting an attachment position of at least one of the first optical component and second optical component in a direction intersecting the optical axis.

16. The projector according to claim 15, wherein said focusing lens array, said polarization converting device, and said combining lens are integrated.

17. The projector according to claim 15, further including:
a first adjusting mechanism for adjusting said first optical component in a first direction orthogonally intersecting said optical axis; and
a second adjusting mechanism for adjusting said second optical component in a second direction orthogonally intersecting said optical axis and said first direction.

18. The projector according to claim 17, said adjusting mechanism further including: a spring provided at a first side of said optical component for pressing said first side; and a screw provided at a second side of said optical component opposing said first side thereof, for pressing said second side.

19. The projector according to claim 18, wherein said spring is a leaf spring, and said screw presses the approximate center of said second side.

20. A projector having an optical axis, comprising:
a light source emitting light flux;
modulating means for modulating light flux emitted from said light source;
projecting means for performing enlarged projection of said light flux modulated by said modulating means;
a reflecting device provided in the optical path between said light source and said modulating means;

an adjusting mechanism for adjusting an attachment position of said reflecting device a light guide for storing said reflecting device;

wherein said adjusting mechanism further includes:

a holder plate which holds said reflecting device and is rotatably supported by said light guide;

a screw for adjusting an angle of said reflecting device; and a spring for supporting said holder plate as to said light guide.

21. A projector having an optical axis, comprising:

a light source emitting light;

a color separating optical system for separating the emitted light from said light source into light fluxes of three colors;

three modulating means for modulating said light flux of each of said three colors separated by said color separating optical system;

a color synthesizing system for synthesizing the light flux of each color modulated by said three modulating means;

a projecting surface;

a reflecting device disposed in the optical path between said color separating optical system and at least one of said three modulating means; and an adjusting mechanism for adjusting an angle of attachment of said reflecting device;

wherein said adjusting mechanism adjusts the attachment angle of said reflecting device positioned closest to said modulating means a light guide for storing said color separating optical system reflecting device;

wherein said adjusting mechanism further includes:

a holder plate which holds said reflecting device and is rotatably supported by said light guide;

a screw for adjusting an angle of said reflecting device; and a spring for supporting said holder plate as to said light guide.

* * * * *